US012011404B2

(12) United States Patent
Fox et al.

(10) Patent No.: US 12,011,404 B2
(45) Date of Patent: Jun. 18, 2024

(54) DEVICES AND SYSTEMS FOR MOVING A PERSON ON A SUPPORT APPARATUS

(71) Applicant: SENECA DEVICES, INC., Raleigh, NC (US)

(72) Inventors: Samuel T. Fox, Durham, NC (US); Jeremy Y. Nezaria, Wakefield, MA (US)

(73) Assignee: SENECA DEVICES, INC., Raleigh, NC (US)

( * ) Notice: Subject to any disclaimer, the term of this patent is extended or adjusted under 35 U.S.C. 154(b) by 467 days.

(21) Appl. No.: 17/432,786

(22) PCT Filed: Feb. 21, 2020

(86) PCT No.: PCT/US2020/019211
§ 371 (c)(1),
(2) Date: Aug. 20, 2021

(87) PCT Pub. No.: WO2020/172525
PCT Pub. Date: Aug. 27, 2020

(65) Prior Publication Data

US 2022/0000690 A1 Jan. 6, 2022

Related U.S. Application Data

(60) Provisional application No. 62/844,944, filed on May 8, 2019, provisional application No. 62/809,214, filed on Feb. 22, 2019.

(51) Int. Cl.

| | |
|---|---|
| *A61G 7/10* | (2006.01) |
| *A61G 5/10* | (2006.01) |
| *A61G 7/00* | (2006.01) |

(52) U.S. Cl.
CPC ............. *A61G 7/1021* (2013.01); *A61G 5/10* (2013.01); *A61G 7/001* (2013.01); *A61G 7/1026* (2013.01); *A61G 7/10* (2013.01); *A61G 2203/40* (2013.01)

(58) Field of Classification Search
CPC ...... A61G 7/1026; A61G 7/1021; A61G 5/10; A61G 7/001; A61G 2203/40; A61G 7/015;
(Continued)

(56) References Cited

U.S. PATENT DOCUMENTS 4,941,220 A * 7/1990 DiMatteo ............... A61G 5/006 5/715
4,941,221 A 7/1990 Kanzler
(Continued)

FOREIGN PATENT DOCUMENTS

DE 3514040 A1 10/1986
WO WO-2017106261 A1 * 6/2017 ............. A47G 9/007
WO WO-2017120659 A1 * 7/2017 ............... A61G 5/10

OTHER PUBLICATIONS

European Patent Office. Extended European Search Report. Issued in EP Application No. 20759394.8.dated Oct. 10, 2022 from corresponding European Patent Application No. 20759394.8. 7 pages.
(Continued)

*Primary Examiner* — David R Hare
*Assistant Examiner* — Deborah Talitha Gedeon
(74) *Attorney, Agent, or Firm* — Robinson IP Law, PLLC

(57) ABSTRACT

Various implementations include a device for moving a person on a support apparatus. The device includes a base, an expandable volume, and a sheet. The base has a first side, a second side, and a support apparatus coupler for coupling the device to a support apparatus. The expandable volume is disposed on a surface of the base between the first side and
(Continued)

the second side and is actuatable from a first position to a second position. The sheet has a first portion that is stationary with respect to the base and a second portion. The sheet extends from the first portion, over the second side, over the expandable volume, and over the first side. Actuation of the expandable volume from the first position to the second position increases a length of the sheet extending from the second side of the base to the first side of the base.

22 Claims, 19 Drawing Sheets

(58) Field of Classification Search
CPC .......... A61G 7/10; A47G 9/02; A47G 9/0207; A47G 9/0215; A47G 9/0223; A47G 9/023; A47G 9/0228; A47G 9/0246
See application file for complete search history.

(56) References Cited

U.S. PATENT DOCUMENTS

| | | | | |
|---|---|---|---|---|
| 4,979,249 | A | 12/1990 | Meade, II | |
| 5,020,171 | A | 6/1991 | Dimatteo et al. | |
| 5,651,149 | A | 7/1997 | Garman | |
| 7,090,647 | B2 | 8/2006 | Mimura et al. | |
| 8,453,276 | B2 | 6/2013 | Hillenbrand, II | |
| 9,003,578 | B2 | 4/2015 | Hillenbrand, II | |
| 9,205,012 | B2 | 12/2015 | Hillenbrand, II et al. | |
| 10,258,525 | B2 | 4/2019 | Hillenbrand, II et al. | |
| 2001/0044957 | A1 | 11/2001 | Hodgetts | |
| 2005/0138727 | A1* | 6/2005 | Faux | A61G 7/1044 5/81.1 R |
| 2005/0150044 | A1* | 7/2005 | Votel | A61G 7/052 5/81.1 R |
| 2006/0053698 | A1* | 3/2006 | Minning | A61G 7/0533 5/81.1 R |
| 2012/0299353 | A1* | 11/2012 | Griswold | A61G 7/018 297/183.1 |
| 2015/0026882 | A1* | 1/2015 | Hillenbrand | A61G 7/1026 5/81.1 HS |
| 2017/0055734 | A1* | 3/2017 | Duck | A61G 1/048 |
| 2021/0322241 | A1 | 10/2021 | Stryker et al. | |

OTHER PUBLICATIONS

International Search Report and Written Opinion, issued by the International Searching Authority (ISA/US) in PCT Application No. PCT/US2020/019211 on Jul. 1, 2020. 13 pages.

* cited by examiner

DEVICES AND SYSTEMS FOR MOVING A PERSON ON A SUPPORT APPARATUS

CROSS-REFERENCE TO RELATED APPLICATIONS

This application is a national stage application filed under 35 U.S.C. § 371 of PCT/US2020/019211 filed Feb. 21, 2020, which claims the benefit of U.S. Provisional Patent Application No. 62/809,214, filed Feb. 22, 2019, and U.S. Provisional Patent Application No. 62/844,944, filed May 8, 2019, the contents of which are incorporated herein by reference in their entireties.

BACKGROUND

Patients who are confined to a bed or wheel chair often rely on other people to assist them in moving in the bed or wheel chair. Due to gravitational forces, patients often tend to slide toward the foot end of inclined beds or toward the edge of the seat of an upright wheel chair. Because of factors like the weight of the patient, the position of the bed or the wheel chair, and the strength of the assisting person, moving the patient back toward the head end of the bed or toward the back support of the wheel chair can be a challenging task.

Often, an assisting person positions a sheet or towel under the patient such that a portion of the sheet or towel extends from underneath the patient. The assisting person then pulls the sheet or towel in the direction of the extending portion of the sheet or towel to slide the patient in the bed or wheel chair. This method of moving a person still presents challenges for the assisting person, due to the relative weight of the patient and strength of the assisting person.

Previous devices attempting to solve this problem include a long sheet connected to a roller at the head end of a bed and a roller at the foot end of the bed. The patient is positioned on the portion of the sheet extending along the top surface of the bed between the two rollers. When the patient needs to be moved toward the head end of the bed, a motor rotates the roller at the head end of the bed, rolling a portion of the sheet from the roller at the foot end of the bed toward the head end of the bed. The rolling of the sheet causes the patient positioned on the sheet to be moved toward the head end of the bed. As the patient later slides toward the foot end of the bed due to movement and gravity, more of the sheet is rolled onto the roller on the head end of the bed to move the patient back toward the head end of the bed. However, this roller mechanism presents a pinching hazard around the mattress and may require electronic components in close proximity to the patient. Furthermore, it can be difficult to comprehensively clean the roller or other components where the sheet is attached to the device.

Thus, a need exists for a device that can move a patient toward the head end of a bed that does not involve physical force from the assisting person, does not present a pinching hazard, does not place electronics in close proximity to the patient, and remains easy to comprehensively clean.

Patients who are confined to a bed must also be laterally turned on a regular basis to prevent bed sores and allow the caregiver to access the patient's back side for hygiene, skin assessment, and wound care procedures, as well as the placement of devices including transfer slings, sheets, towels, and bedpans. Because of the height or width of some patients and the narrowness of some beds, some patients laying in the supine position in the center of a bed do not have enough space to be fully turned on the patient's side in a comfortable manner that allows the caregiver access to the patient's back side. For the same reasons discussed above with respect to moving a patient toward the head end of the bed, both moving the patient laterally on the bed and turning the patient onto the patient's side can be very difficult for the assisting person.

Thus, a need exists for a device that can assist in turning a patient onto the patient's side that limits the physical force involved from the assisting person.

SUMMARY

Various implementations include a device for moving a person on a support apparatus. The device includes a base, an expandable volume, and a sheet. The base has a first side and a second side opposite and spaced apart from the first side. The base has a support apparatus coupler for coupling the device to a portion of a support apparatus. The expandable volume is disposed on a surface of the base between the first side and the second side. The expandable volume is actuatable from a first position to a second position. The sheet has a first portion and a second portion opposite and spaced apart from the first portion. The second portion is for supporting a patient. The first portion of the sheet is stationary with respect to the base. The sheet extends from the first portion, over the second side, over the expandable volume, and over the first side. Actuation of the expandable volume from the first position to the second position increases a length of the sheet extending from the second side of the base to the first side of the base.

In some implementations, the expandable volume comprises an inflatable cushion. In some implementations, the device further includes a pumping device for actuating the inflatable cushion from the first position to the second position. In some implementations, the pumping device is disposed externally to the inflatable cushion.

In some implementations, the expandable volume comprises a linear actuator.

In some implementations, the second portion of the sheet is closer to the base in the second position than in the first position.

In some implementations, the first portion of the sheet is coupled to the base. In some implementations, the first portion of the sheet is decouplable from the base.

In some implementations, the support apparatus is a bed, and the support apparatus coupler is couplable adjacent a head end of a mattress of the bed.

In some implementations, the support apparatus is a bed, and the support apparatus coupler is couplable adjacent a side end of a mattress of the bed. In some implementations, the support apparatus coupler is couplable adjacent a bottom side of a mattress of the bed. In some implementations, actuation of the expandable volume from the first position to the second position raises a portion of the mattress of the bed.

In some implementations, the support apparatus is a bed, and the support apparatus coupler is couplable to a head end of a frame of the bed.

In some implementations, the support apparatus is a bed, and the support apparatus coupler is couplable adjacent a side end of a frame of the bed.

In some implementations, the support apparatus is a chair, and the support apparatus coupler is couplable to a back support portion of the chair. In some implementations, the chair is a wheel chair.

In some implementations, the base includes a first base portion and a second base portion. The second base portion has a first end and a second end. The first base portion includes the support apparatus coupler, and the first end of the second base portion is pivotably coupled to the first base portion. The expandable volume is disposed between the first base portion and the second base portion such that the second base portion pivots relative to the first base portion when the expandable volume actuates from the first position to the second position. In some implementations, the first base portion includes the first side and the second base portion includes the second side.

In some implementations, the support apparatus is a bed having a mattress and the sheet has a first side for contacting the skin of a patient and a second side for contacting the mattress. The first side of the sheet has a first coefficient of friction between the first side of the sheet and the skin of a patient and the second side of the sheet has a second coefficient of friction between the second side of the sheet and the mattress. The first coefficient of friction is greater than the second coefficient of friction.

In some implementations, the support apparatus is a bed having a mattress, and a coefficient of friction between a top surface of the mattress and a bottom side of the sheet is between 0.20 and 0.50. In some implementations, the coefficient of friction between a top surface of the mattress and a bottom side of the sheet is between 0.30 and 0.35. In some implementations, the coefficient of friction between a top surface of the mattress and a bottom side of the sheet is 0.33.

In some implementations, the device further includes a strain gauge for measuring the strain exerted on the sheet.

Various other implementations include a device for moving a person on a support apparatus. The device includes a base, and an expandable volume. The base has a first side and a second side opposite and spaced apart from the first side. The base has a support apparatus coupler for coupling the device to a portion of a support apparatus. The expandable volume is disposed on a surface of the base between the first side and the second side. The expandable volume is actuatable from a first position to a second position. Actuation of the expandable volume from the first position to the second position increases a length as measured from the second side, over the expandable volume, to the first side.

In some implementations, the base includes a sheet coupler for affixing a sheet to the base. In some implementations, the sheet coupler includes a web assembly. The web assembly has a first web assembly portion coupled to the base and a second web assembly portion for affixing a sheet to the base. In some implementations, the web assembly comprises at least one strap.

In some implementations, the expandable volume comprises an inflatable cushion. In some implementations, the device further includes a pumping device for actuating the inflatable cushion from the first position to the second position. In some implementations, the pumping device is disposed externally to the inflatable cushion.

In some implementations, the expandable volume comprises a linear actuator.

In some implementations, the support apparatus is a bed, and the support apparatus coupler is couplable adjacent a head end of a mattress of the bed.

In some implementations, the support apparatus is a bed, and the support apparatus coupler is couplable adjacent a side end of a mattress of the bed. In some implementations, the support apparatus coupler is couplable adjacent a bottom side of a mattress of the bed. In some implementations, actuation of the expandable volume from the first position to the second position raises a portion of the mattress of the bed.

In some implementations, the support apparatus is a bed, and the support apparatus coupler is couplable to a head end of a frame of the bed.

In some implementations, the support apparatus is a bed, and the support apparatus coupler is couplable adjacent a side end of a frame of the bed.

In some implementations, the support apparatus is a chair, and the support apparatus coupler is couplable to a back support portion of the chair. In some implementations, the chair is a wheel chair.

In some implementations, the mount includes a first mount portion and a second mount portion. The second mount portion has a first end and a second end. The first mount portion includes the support apparatus coupler, and the first end of the second mount portion is pivotably coupled to the first mount portion. The expandable volume is disposed between the first mount portion and the second mount portion such that the second mount portion pivots relative to the first mount portion when the expandable volume actuates from the first position to the second position. In some implementations, the first mount portion includes the first side and the second mount portion includes the second side.

In some implementations, the device further includes a sheet affixed to the sheet coupler. The support apparatus is a bed having a mattress and the sheet has a first side for contacting the skin of a patient and a second side for contacting the mattress. The first side of the sheet has a first coefficient of friction between the first side of the sheet and the skin of a patient and the second side of the sheet has a second coefficient of friction between the second side of the sheet and the mattress. The first coefficient of friction is greater than the second coefficient of friction.

In some implementations, the device further includes a sheet affixed to the sheet coupler. The support apparatus is a bed having a mattress, and the coefficient of friction between a top surface of the mattress and a bottom side of the sheet is between 0.20 and 0.50. In some implementations, a coefficient of friction between a top surface of the mattress and a bottom side of the sheet is between 0.30 and 0.35. In some implementations, the coefficient of friction between a top surface of the mattress and a bottom side of the sheet is 0.33.

In some implementations, the device further includes a strain gauge for measuring the strain exerted on a sheet affixed to the base.

Various other implementations include a sheet for use with a device for moving a person on a support apparatus. The sheet includes a main body and a first elastic strip. The main body has a first sheet edge and a second sheet edge spaced apart and opposite from the first sheet edge. The first elastic strip has a first edge and a second edge spaced apart and opposite the first edge. The first elastic strip is resiliently biased toward a relaxed position and urgeable to an extended position. The first elastic strip further has a first relaxed width as measured between the first and second edges of the first elastic strip in the relaxed position. The first edge of the first elastic strip is coupled to the first sheet edge and the second edge of the first elastic strip is coupled to a first portion of the main body. A distance between the first sheet edge and the first portion of the main body is greater than the first relaxed width.

In some implementations, the sheet further includes a second elastic strip having a first edge and a second edge spaced apart and opposite the first edge. The second elastic strip is resiliently biased toward a relaxed position and urgeable to an extended position. The second elastic strip further has a second relaxed width as measured between the first and second edges of the second elastic strip in the relaxed position. The second edge of the second elastic strip is coupled to the second sheet edge and the first edge of the second elastic strip is coupled to a second portion of the main body. A distance between the second sheet edge and the second portion of the main body is greater than the second relaxed width.

In some implementations, the first elastic strip has a first extended width as measured between the first and second edges of the first elastic strip in the extended position. The distance between the first sheet edge and the first portion of the main body is equal to the first extended width.

In some implementations, the second elastic strip has a second extended width as measured between the first and second edges of the second elastic strip in the extended position. The distance between the second sheet edge and the second portion of the main body is equal to the second extended width.

In some implementations, the distance between the first sheet edge and the first portion of the main body is double the first relaxed width.

In some implementations, the distance between the second sheet edge and the second portion of the main body is double the second relaxed width.

In some implementations, the first elastic strip comprises an elastic fabric. In some implementations, the first elastic strip comprises spandex.

In some implementations, the second elastic strip comprises an elastic fabric. In some implementations, the second elastic strip comprises spandex.

In some implementations, at least a portion of the first edge of the main body includes a first coupler for coupling the sheet to a portion of a device for moving a person on a support apparatus, and at least a portion of the second edge of the main body includes a second coupler for coupling the sheet to another portion of the device for moving a person on a support apparatus. In some implementations, the first coupler and the second coupler each comprise at least a portion of a zipper.

In some implementations, the sheet further includes a third elastic strip having a first edge and a second edge spaced apart and opposite the first edge. The third elastic strip is resiliently biased toward a relaxed position and urgeable to an extended position. The third elastic strip further has a third relaxed width as measured between the first and second edges of the third elastic strip in the relaxed position. The second edge of the third elastic strip is coupled to the third sheet edge and the first edge of the third elastic strip is coupled to a third portion of the main body. A distance between the third sheet edge and the third portion of the main body is greater than the third relaxed width.

In some implementations, the sheet further includes a fourth elastic strip having a first edge and a second edge spaced apart and opposite the first edge. The fourth elastic strip is resiliently biased toward a relaxed position and urgeable to an extended position. The fourth elastic strip further has a fourth relaxed width as measured between the first and second edges of the fourth elastic strip in the relaxed position. The second edge of the fourth elastic strip is coupled to the fourth sheet edge and the first edge of the fourth elastic strip is coupled to a fourth portion of the main body. A distance between the fourth sheet edge and the fourth portion of the main body is greater than the fourth relaxed width.

Various other implementations include a system for moving a person on a bed. The system includes a first device and a second device. The first device is for disposing between a side end of a mattress and a bed frame. The first device includes a base and an expandable volume. The expandable volume is disposed on a surface of the base. The expandable volume is actuatable from a first position to a second position. A portion of the expandable volume is further from the base in the second position than in the first position. The second device includes a base and an expandable volume. The base has a first side and a second side opposite and spaced apart from the first side. The base has a support apparatus coupler for coupling the device to a portion of a support apparatus. The base further includes a sheet coupler for affixing a sheet to the base. The expandable volume is disposed on a surface of the base between the first side and the second side. The expandable volume is actuatable from a first position to a second position. Actuation of the expandable volume from the first position to the second position increases a length as measured from the second side, over the expandable volume, to the first side.

In some implementations, the expandable volume of the first device comprises an inflatable cushion. In some implementations, the system further includes a pumping device for actuating the inflatable cushion from the first position to the second position. In some implementations, the pumping device is disposed externally to the inflatable cushion.

In some implementations, the expandable volume of the second device comprises an inflatable cushion. In some implementations, the system further includes a pumping device for actuating the inflatable cushion from the first position to the second position. In some implementations, the pumping device is disposed externally to the inflatable cushion.

In some implementations, the sheet coupler includes a web assembly. The web assembly has a first web assembly portion coupled to the base and a second web assembly portion for affixing a sheet to the base. In some implementations, the web assembly comprises at least one strap. In some implementations, the system further includes a pumping device for actuating the inflatable cushion from the first position to the second position. In some implementations, the pumping device is disposed externally to the inflatable cushion.

In some implementations, the system further includes a sheet coupled to the sheet coupler. The sheet includes a main body and a first elastic strip. The main body has a first sheet edge and a second sheet edge spaced apart and opposite from the first sheet edge. The first elastic strip has a first edge and a second edge spaced apart and opposite the first edge. The first elastic strip is resiliently biased toward a relaxed position and urgeable to an extended position. The first elastic strip further has a first relaxed width as measured between the first and second edges of the first elastic strip in the relaxed position. The first edge of the first elastic strip is coupled to the first sheet edge and the second edge of the first elastic strip is coupled to a first portion of the main body. A distance between the first sheet edge and the first portion of the main body is greater than the first relaxed width.

In some implementations, the sheet further includes a second elastic strip having a first edge and a second edge spaced apart and opposite the first edge. The second elastic strip is resiliently biased toward a relaxed position and urgeable to an extended position. The second elastic strip further has a second relaxed width as measured between the first and second edges of the second elastic strip in the relaxed position. The second edge of the second elastic strip is coupled to the second sheet edge and the first edge of the second elastic strip is coupled to a second portion of the main body. A distance between the second sheet edge and the second portion of the main body is greater than the second relaxed width.

In some implementations, the first elastic strip has a first extended width as measured between the first and second edges of the first elastic strip in the extended position. The distance between the first sheet edge and the first portion of the main body is equal to the first extended width.

In some implementations, the second elastic strip has a second extended width as measured between the first and second edges of the second elastic strip in the extended position. The distance between the second sheet edge and the second portion of the main body is equal to the second extended width.

In some implementations, the distance between the first sheet edge and the first portion of the main body is double the first relaxed width.

In some implementations, the distance between the second sheet edge and the second portion of the main body is double the second relaxed width.

In some implementations, the first elastic strip comprises an elastic fabric. In some implementations, the first elastic strip comprises spandex.

In some implementations, the second elastic strip comprises an elastic fabric. In some implementations, the second elastic strip comprises spandex.

In some implementations, at least a portion of the first edge of the main body includes a first coupler for coupling the sheet to a portion of a device for moving a person on a support apparatus, and at least a portion of the second edge of the main body includes a second coupler for coupling the sheet to another portion of the device for moving a person on a support apparatus. In some implementations, the first coupler and the second coupler each comprise at least a portion of a zipper.

In some implementations, the sheet further includes a third elastic strip having a first edge and a second edge spaced apart and opposite the first edge. The third elastic strip is resiliently biased toward a relaxed position and urgeable to an extended position. The third elastic strip further has a third relaxed width as measured between the first and second edges of the third elastic strip in the relaxed position. The second edge of the third elastic strip is coupled to the third sheet edge and the first edge of the third elastic strip is coupled to a third portion of the main body. A distance between the third sheet edge and the third portion of the main body is greater than the third relaxed width.

In some implementations, the sheet further includes a fourth elastic strip having a first edge and a second edge spaced apart and opposite the first edge. The fourth elastic strip is resiliently biased toward a relaxed position and urgeable to an extended position. The fourth elastic strip further has a fourth relaxed width as measured between the first and second edges of the fourth elastic strip in the relaxed position. The second edge of the fourth elastic strip is coupled to the fourth sheet edge and the first edge of the fourth elastic strip is coupled to a fourth portion of the main body. A distance between the fourth sheet edge and the fourth portion of the main body is greater than the fourth relaxed width.

Various other implementations include a device for moving a person on a bed. The device includes a base, an inner expandable volume, an outer expandable volume, and a middle expandable volume.

The base has a first side and a second side opposite and spaced apart from the first side. The base has a support apparatus coupler for coupling the device to a portion of a support apparatus. The base further includes a sheet coupler for affixing a sheet to the base.

The inner expandable volume is for disposing between a side end of a mattress and a bed frame. The inner expandable volume is disposed on a surface of the base between the first side and the second side. The expandable volume is actuatable from a first position to a second position. A portion of the inner expandable volume is further from the base in the second position than in the first position. The outer expandable volume is for disposing adjacent a side end of a mattress and a bed frame. The inner expandable volume is disposed on the surface of the base between the first side and the second side. The expandable volume is actuatable from a first position to a second position. A portion of the outer expandable volume is further from the base in the second position than in the first position.

The middle expandable volume is disposed on the surface of the base between the first side and the second side between the inner expandable volume and the outer expandable volume. The middle expandable volume is actuatable from a first position to a second position. A portion of the middle expandable volume is further from the base in the second position than in the first position. Actuation of the outer expandable volume from the first position to the second position increases a length as measured from the second side of the outer expandable volume, over the outer expandable volume expandable volume, to the portion of the outer expandable volume.

In some implementations, the inner expandable volume comprises an inflatable cushion. In some implementations, the device further includes a pumping device for actuating the inner inflatable cushion from the first position to the second position. In some implementations, the pumping device is disposed externally to the inflatable cushion.

In some implementations, the outer expandable volume comprises an inflatable cushion. In some implementations, the device further includes a pumping device for actuating the outer inflatable cushion from the first position to the second position. In some implementations, the pumping device is disposed externally to the inflatable cushion.

In some implementations, the middle expandable volume comprises an inflatable cushion. In some implementations, the device further includes a pumping device for actuating the middle inflatable cushion from the first position to the second position. In some implementations, the pumping device is disposed externally to the inflatable cushion.

In some implementations, the sheet coupler includes a web assembly. The web assembly has a first web assembly portion coupled to the base and a second web assembly portion for affixing a sheet to the base. In some implementations, the web assembly comprises at least one strap.

In some implementations, the device further includes a sheet coupled to the sheet coupler. The sheet includes a main body and a first elastic strip. The main body has a first sheet edge and a second sheet edge spaced apart and opposite from the first sheet edge. The first elastic strip has a first edge and a second edge spaced apart and opposite the first edge. The first elastic strip is resiliently biased toward a relaxed position and urgeable to an extended position. The first elastic strip further has a first relaxed width as measured between the first and second edges of the first elastic strip in the relaxed position. The first edge of the first elastic strip is coupled to the first sheet edge and the second edge of the first elastic strip is coupled to a first portion of the main body. A distance between the first sheet edge and the first portion of the main body is greater than the first relaxed width.

In some implementations, the sheet further includes a second elastic strip having a first edge and a second edge spaced apart and opposite the first edge. The second elastic strip is resiliently biased toward a relaxed position and urgeable to an extended position. The second elastic strip further has a second relaxed width as measured between the first and second edges of the second elastic strip in the relaxed position. The second edge of the second elastic strip is coupled to the second sheet edge and the first edge of the second elastic strip is coupled to a second portion of the main body. A distance between the second sheet edge and the second portion of the main body is greater than the second relaxed width.

In some implementations, the first elastic strip has a first extended width as measured between the first and second edges of the first elastic strip in the extended position. The distance between the first sheet edge and the first portion of the main body is equal to the first extended width.

In some implementations, the second elastic strip has a second extended width as measured between the first and second edges of the second elastic strip in the extended position. The distance between the second sheet edge and the second portion of the main body is equal to the second extended width.

In some implementations, the distance between the first sheet edge and the first portion of the main body is double the first relaxed width.

In some implementations, the distance between the second sheet edge and the second portion of the main body is double the second relaxed width.

In some implementations, the first elastic strip comprises an elastic fabric. In some implementations, the first elastic strip comprises spandex.

In some implementations, the second elastic strip comprises an elastic fabric. In some implementations, the second elastic strip comprises spandex.

In some implementations, at least a portion of the first edge of the main body includes a first coupler for coupling the sheet to a portion of a device for moving a person on a support apparatus, and at least a portion of the second edge of the main body includes a second coupler for coupling the sheet to another portion of the device for moving a person on a support apparatus. In some implementations, the first coupler and the second coupler each comprise at least a portion of a zipper.

In some implementations, the sheet further includes a third elastic strip having a first edge and a second edge spaced apart and opposite the first edge. The third elastic strip is resiliently biased toward a relaxed position and urgeable to an extended position. The third elastic strip further has a third relaxed width as measured between the first and second edges of the third elastic strip in the relaxed position. The second edge of the third elastic strip is coupled to the third sheet edge and the first edge of the third elastic strip is coupled to a third portion of the main body. A distance between the third sheet edge and the third portion of the main body is greater than the third relaxed width.

In some implementations, the sheet further includes a fourth elastic strip having a first edge and a second edge spaced apart and opposite the first edge. The fourth elastic strip is resiliently biased toward a relaxed position and urgeable to an extended position. The fourth elastic strip further has a fourth relaxed width as measured between the first and second edges of the fourth elastic strip in the relaxed position. The second edge of the fourth elastic strip is coupled to the fourth sheet edge and the first edge of the fourth elastic strip is coupled to a fourth portion of the main body. A distance between the fourth sheet edge and the fourth portion of the main body is greater than the fourth relaxed width.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

Figure 1A:
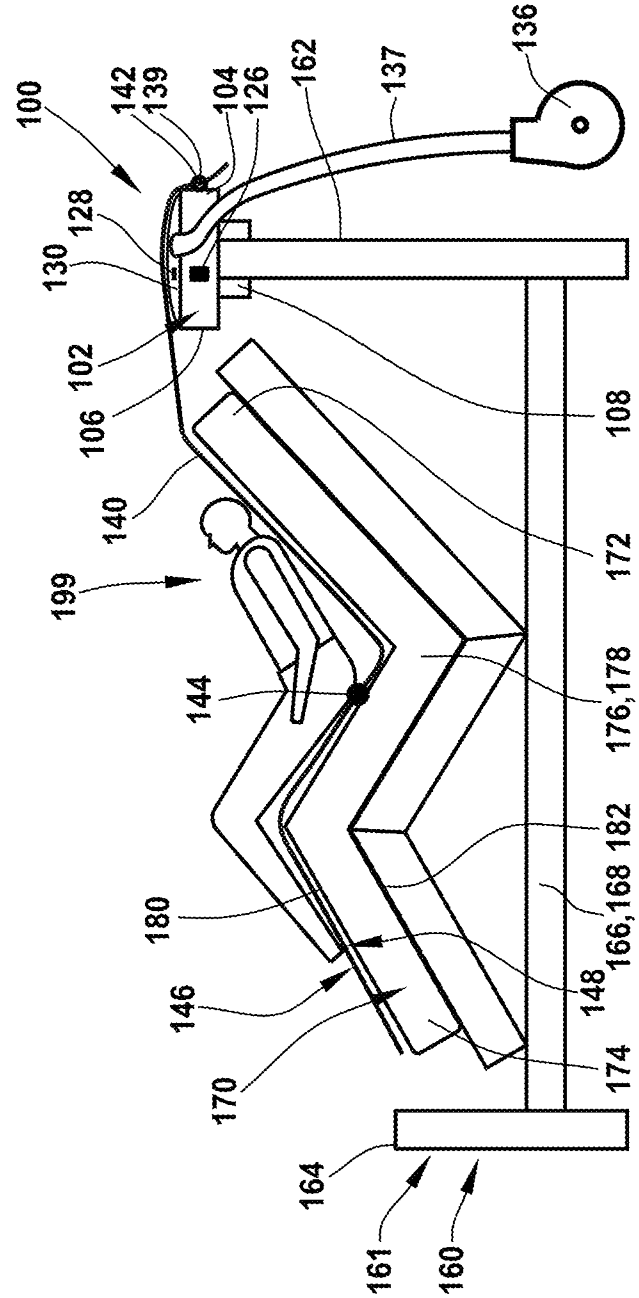
FIGS. 1A and 1B are side views of a device for moving a person on a bed toward the head end of the bed, according to one implementation.

The devices disclosed herein allow a person to be easily moved and/or turned in a bed, chair, or other support apparatus. The devices include an expandable volume such as an inflatable cushion, rotatable arm, or actuator. A sheet is coupled to the device and extends over the expandable volume onto the bed, chair, or other support apparatus such that a person can lay or sit on a portion of the sheet. When the expandable volume is actuated, the expandable volume increases the distance which the sheet extends over it, which pulls the portion of the sheet supporting the person toward the device.

Various implementations include a device for moving a person on a support apparatus with a sheet. The device includes a base, an expandable volume, and a sheet. The base has a first side and a second side opposite and spaced apart from the first side. The base has a support apparatus coupler for coupling the device to a portion of a support apparatus. The expandable volume is disposed on a surface of the base between the first side and the second side. The expandable volume is actuatable from a first position to a second position. The sheet has a first portion and a second portion opposite and spaced apart from the first portion. The second portion is for supporting a patient. The first portion of the sheet is stationary with respect to the base. The sheet extends from the first portion, over the second side, over the expandable volume, and over the first side. Actuation of the expandable volume from the first position to the second position increases a length of the sheet extending from the second side of the base to the first side of the base. Moving the sheet moves the person on the support apparatus.

Various other implementations include a device for moving a person on a support apparatus. The device includes a base and an expandable volume. The base has a first side and a second side opposite and spaced apart from the first side. The base has a support apparatus coupler for coupling the device to a portion of a support apparatus. The expandable volume is disposed on a surface of the base between the first side and the second side. The expandable volume is actuatable from a first position to a second position. Actuation of the expandable volume from the first position to the second position increases a length as measured from the second side, over the expandable volume, to the first side.

Various other implementations include a sheet for use with a device for moving a person on a support apparatus. The sheet includes a main body and a first elastic portion. The main body has a first sheet edge and a second sheet edge spaced apart and opposite from the first sheet edge. The first elastic strip has a first edge and a second edge spaced apart and opposite the first edge. The first elastic strip is resiliently biased toward a relaxed position and urgeable to an extended position. The first elastic strip further has a first relaxed width as measured between the first and second edges of the first elastic strip in the relaxed position. The first edge of the first elastic strip is coupled to the first sheet edge and the second edge of the first elastic strip is coupled to a first portion of the main body. A distance between the first sheet edge and the first portion of the main body is greater than the first relaxed width.

Figure 1B:
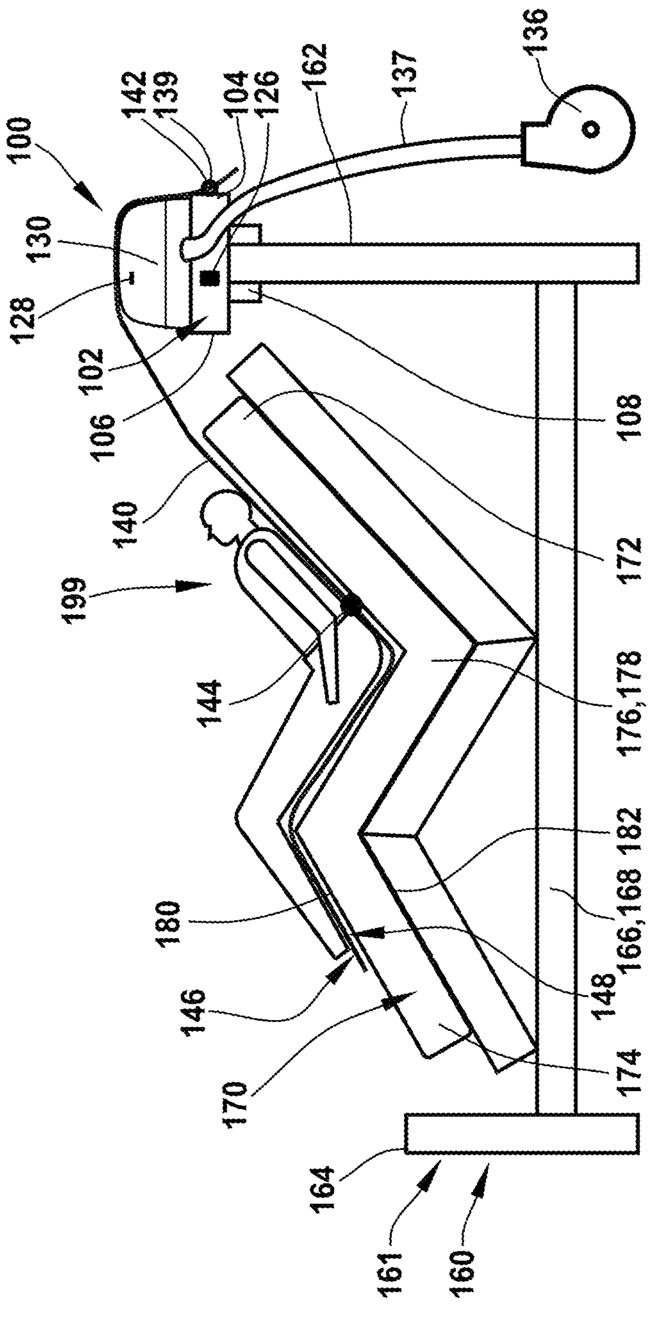

FIGS. 1A and 1B show a device 100 for moving a person 199 on a support apparatus 160. The support apparatus 160 shown in FIGS. 1A and 1B is a bed 160 having bed frame 161 and a mattress 170. However, in other implementations, the support apparatus can be gurney, a stretcher, an operating table, a chair, a wheelchair, or any apparatus on which a person is supported and is prone to move into a less preferred position and would need adjustment. The bed frame 161 has a head end 162, a foot end 164 opposite and spaced apart from the head end 162, and side ends 166, 168. The mattress 170 has a head end 172 for being disposed adjacent the head end 162 of the bed frame 161 and a foot end 174 opposite and spaced apart from the head end 172 of the mattress 170. The mattress 170 also has two side ends 176, 178 each extending from the head end 172 of the mattress 170 to the foot end 174 of the mattress 170. The mattress 170 further has a top surface 180 and a bottom surface 182 opposite and spaced apart from the top surface 180.

The device 100 shown in FIGS. 1A and 1B includes a base 102, an expandable volume 130, and a sheet 140. The base 102 has a first side 104 and a second side 106 opposite and spaced apart from the first side 104. The base 102 shown in FIGS. 1A and 1B is manufactured from a rigid material, but in other implementations, the base is manufactured from a flexible material, such as a woven material or any thin material. In some implementations, the base is a strap.

The support apparatus coupler 108 is disposed on the first side 104 of the base 102. The support apparatus coupler 108 couples the device 100 to a portion of the support apparatus 160 such that the device 100 is anchored to the support apparatus 160 and does not move relative to support apparatus 160 when the device 100 is used. The support apparatus coupler 108 shown in FIGS. 1A and 1B includes a pair of clamps for coupling the device 100 to the head end 162 of the bed frame 161, as discussed below. However, in other implementations, the support apparatus coupler includes a sleeve that securely fits over the head end 162 of the bed frame 161, one or more straps that fit around the head end 162 of the bed frame 161, one or more ratcheting straps that fit around the head end 162 of the bed frame 161, one or more hook and loop strips, fasteners, a sewn stitch connecting to the head end 162 of the bed frame 161, a friction coating, an adhesive, or any other coupler capable of keeping the device coupled to the support apparatus when overcoming the forces applied to the device when the device is moving a person on the support apparatus, as discuss in more detail below.

The support apparatus coupler 108 of the device 100 in FIGS. 1A and 1B is coupled to the head end 162 of the bed frame 161. However, in other implementations, the support apparatus coupler is coupled to the foot end of the bed frame, a side end of the bed frame, the head end of the mattress, the foot end of the mattress, a side end of the mattress, or any other portion of either the bed frame or mattress in which direction the sheet is desired to be pulled, as discussed below. In some implementations, the support apparatus coupler is coupled to the bottom surface of a mattress. In some implementations, the device is not coupled to a portion of the support apparatus. In some implementations, the device is integrated into a portion of the support apparatus, such as the bed frame, the mattress, or the wheelchair. In some implementations, the device is disposed between the bottom surface of the mattress and a portion of the bed frame. As mentioned above, in some implementations, the support apparatus can be gurney, a stretcher, an operating table, a chair, a wheelchair, or any apparatus on which a person is supported and is prone to move into a less preferred position and would need adjustment.

The expandable volume 130 acts as a cam to increase the distance as measured from the second side 106 of the base 102, over the expandable volume 130, to the first side 104 of the base 102 when the expandable volume 130 is actuated from a first position to a second position. When the expandable volume 130 is actuated from a first position to a second position, the expandable volume 130 increases the volume of the of space between the sheet 140 and the base 102 such that the distance as measured from the second side 106 of the base 102, over the expandable volume 130, to the first side 104 of the base 102 increases. Thus, the expandable volume 130 acts as a cam to create a longer distance for the sheet 140 to travel around the base 102. The expandable volume 130 shown in FIGS. 1A and 1B is disposed on the outwardly facing surface of the base 102 of the device 100 between the first side 104 of the base 102 and the second side 106 of the base 102. The expandable volume 130 can be coupled to the base 102 of the device 100 in any way capable of holding the expandable volume 130 stationary relative to the base 102, such as one or more stitches, buttons, a zipper, adhesive, or fasteners. The expandable volume 130 shown in the illustrated implementations of FIGS. 1A and 1B as an inflatable cushion. The expandable volume 130 is actuatable between a first position (shown in FIG. 1A), wherein the inflatable cushion is in a deflated state, and a second position (shown in FIG. 1B), wherein the cushion is fully inflated. However, in other implementations, the first position and the second position are any other states of expansion possible with the expandable volume. The expandable volume 130 shown in FIGS. 1A and 1B is disposed on the outwardly facing surface of the base 102, but in other implementations, the expandable volume is disposed on the inwardly facing surface of the base.

The device 100 can also include an electric pumping device 136 for actuating the inflatable cushion from the first position to the second position. The pumping device 136 in FIGS. 1A and 1B is an electric air compressor disposed externally to the inflatable cushion. The pumping device 136 is located external to the expandable volume 130 to limit noise and vibrations from disturbing the person 199 disposed on the support apparatus 160. However, in other implementations, the pumping device is disposed on the base, is disposed on or within the support apparatus 160, or is disposed on or within the expandable volume. In some implementations, the pump is a manual pump.

Figure 7A:
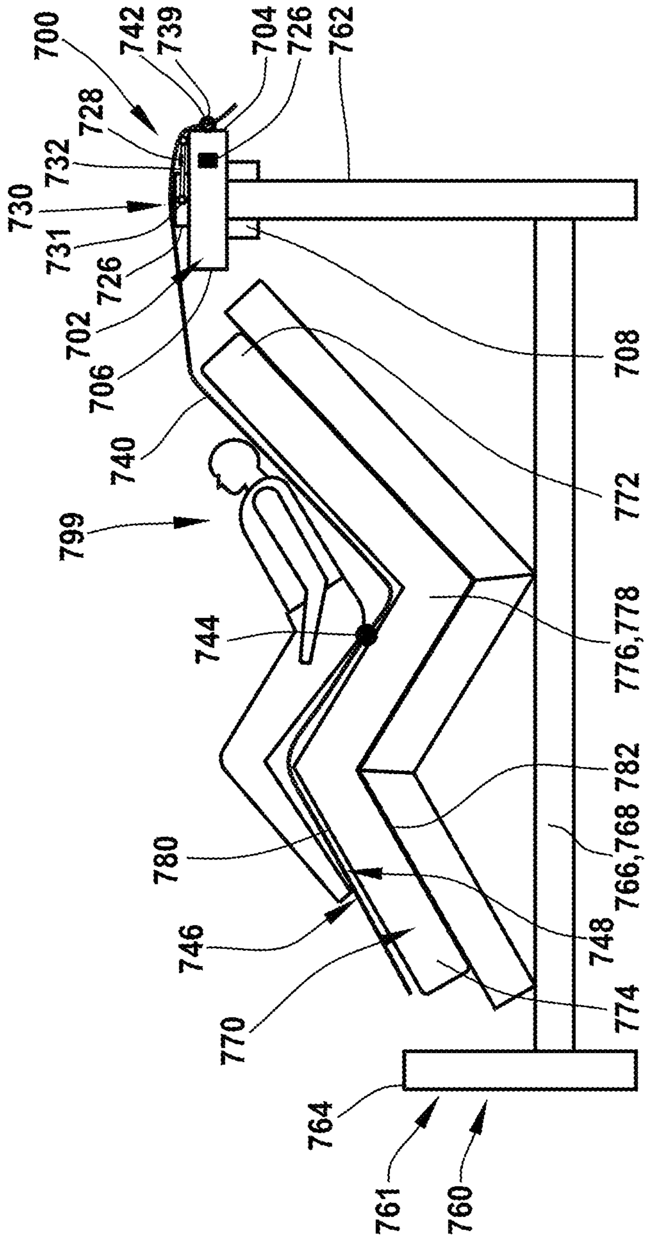
FIGS. 7A and 7B are side views of a device for moving a person on a bed, according to another implementation.
Figure 7B:
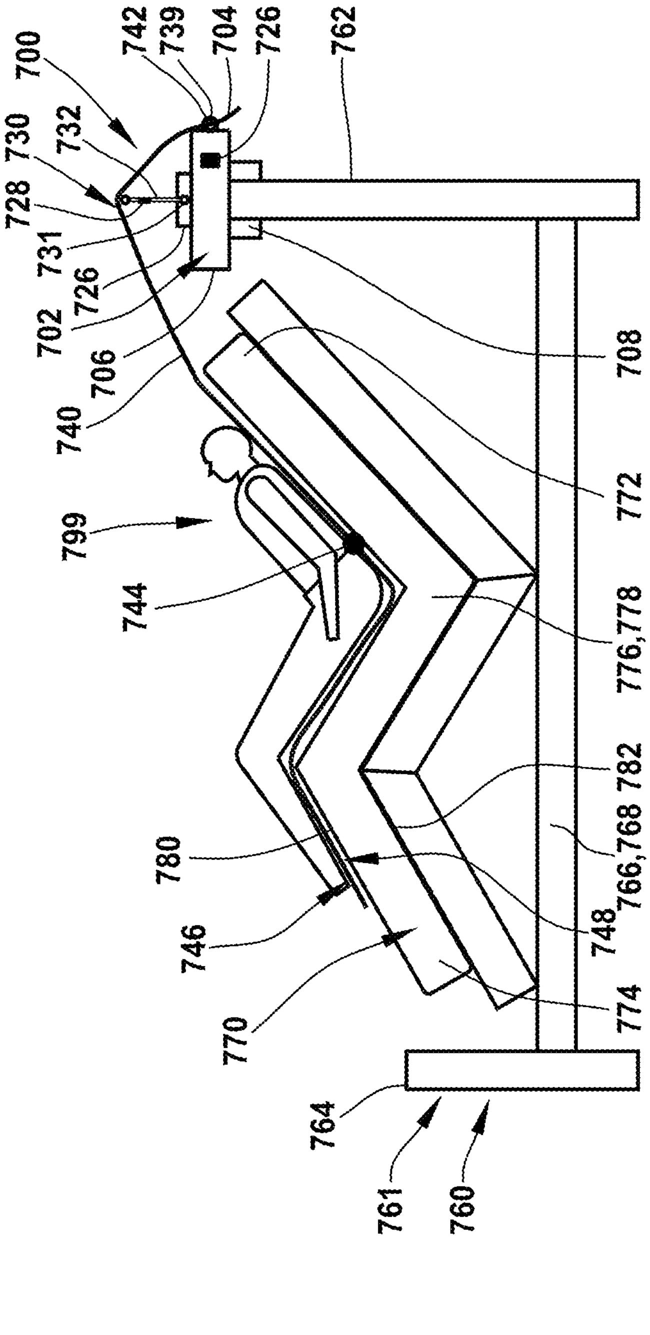

FIGS. 7A and 7B show an implementation of the device 700 including an expandable volume 730 that is a rotatable arm. The rotatable arm includes a shaft 731 and an arm 732. The device also includes a motor 726 coupled to the shaft 731 for rotating the rotatable arm from a first position wherein the arm 732 is perpendicular to the second side 706 (shown in FIG. 7A) to a second position wherein the arm 732 is parallel to the second side 706 (shown in FIG. 7B). When the expandable volume 730 is actuated from the first position to the second position, the distance as measured from the second side 706 of the base 702, over the expandable volume 730, to the first side 704 of the base 702 is increased. Thus, the second portion 744 of the sheet 740 is moved closer to the base 702 when the expandable volume 730 is actuated from the first position to the second position. Although FIGS. 7A and 7B show an electric motor 726 for actuating the expandable volume 730, in some implementations, the shaft of the rotatable arm includes a handle for actuating the expandable device from a first position to a second position.

Figure 8A:
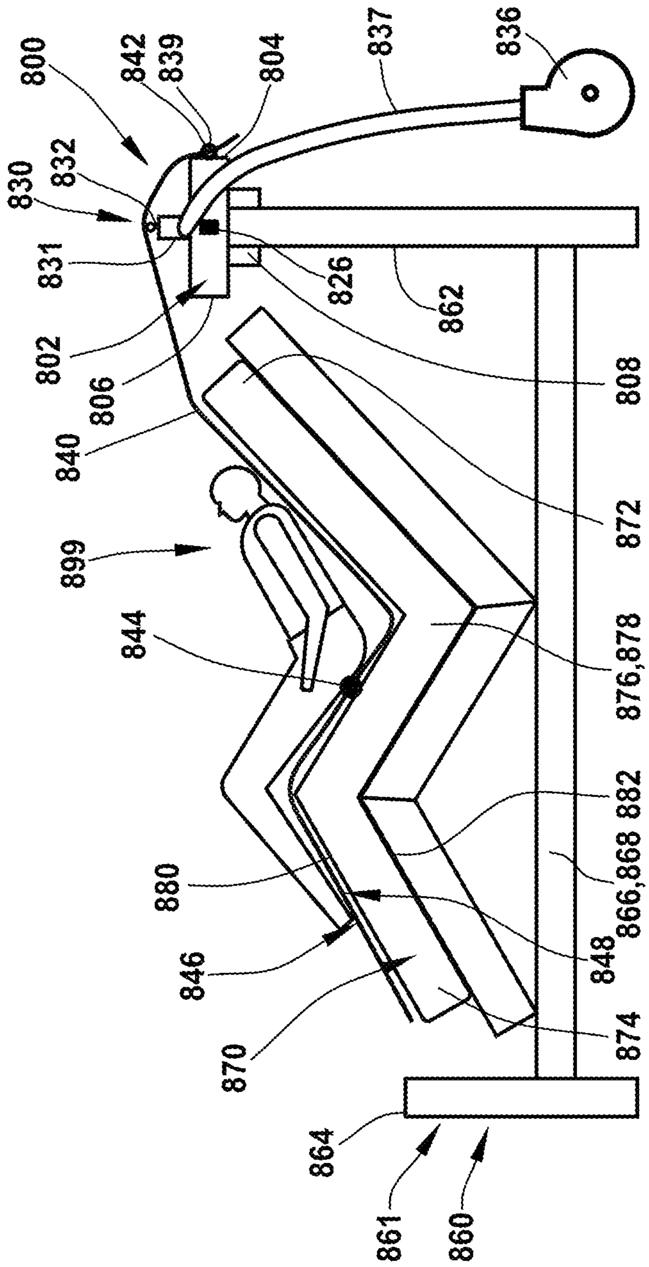
FIGS. 8A and 8B are side views of a device for moving a person on a bed, according to another implementation.
Figure 8B:
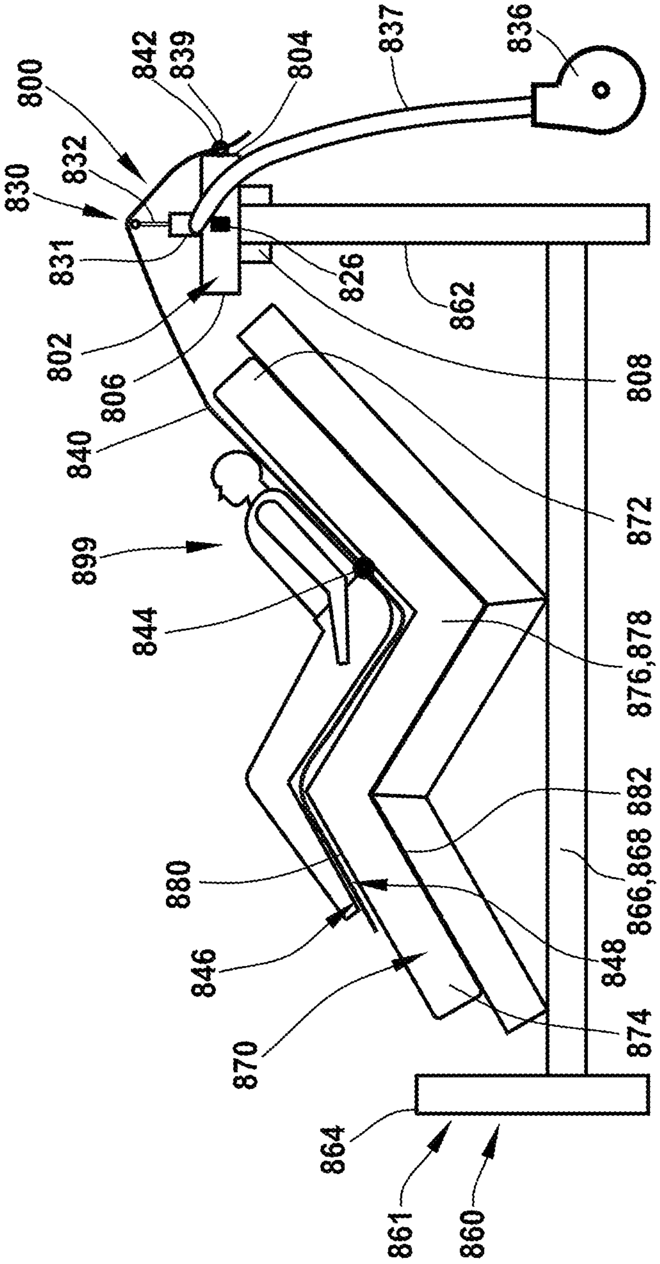

FIGS. 8A and 8B show an implementation of the device 800 including an expandable volume 830 that is a telescoping arm. The telescoping arm includes a cylinder body 831 and a piston rod 832. The device also includes a pump 836 coupled to the cylinder body 831 for introducing air into the cylinder body 831 to cause the piston rod 832 to actuate from a first position wherein the piston rod 832 is retracted toward the base 802 (shown in FIG. 8A) to a second position wherein the piston rod 832 is extended away from the base 802 (shown in FIG. 8B). When the expandable volume 830 is actuated from the first position to the second position, the distance as measured from the second side 806 of the base 802, over the expandable volume 830, to the first side 804 of the base 802 is increased. Thus, the second portion 844 of the sheet 840 is moved closer to the base 802 when the expandable volume 830 is actuated from the first position to the second position. In some implementations, the pump is a manual pump.

The device 100 shown in FIGS. 1A and 1B also includes a sheet 140. The sheet 140 has a first portion 142 and a second portion 144 opposite and spaced apart from the first portion 142. The first portion 142 of the sheet 140 is removably coupled to the base 102 such that the sheet 140 can be removed from the device 100 for cleaning or disposal. The first portion 142 of the sheet 140 remains stationary with respect to the base 102 of the device 100 even with movement of the person 199. The sheet 140 extends from the first portion 142 where it is coupled, over the second side 106 of the base 102, over the expandable volume 130, and over the first side 104 of the base 102. The sheet 140 continues to extend over the top surface 180 of the mattress 170 such that the second portion 144 of the sheet 140 is under and supporting the person 199. The sheet 140 is decouplable from the base 102 so that it can be disposable. For example, the first portion 142 of the sheet 140 is coupled to the base 102 by clamps. However, in other implementations, the first portion of the sheet is coupled to the base by one or multiple fasteners, including hook and loop, a zipper, an adhesive, or any other coupler capable of keeping the sheet coupled to the device when overcoming the forces applied to the sheet when the sheet is moving a person on the support apparatus, as discuss in more detail below. In some implementations, the first portion of the sheet is coupled to a portion of the support apparatus such that the first portion of the sheet remains stationary with respect to the device. In some implementations, the sheet is permanently coupled to the device or support apparatus.

Figure 5A:
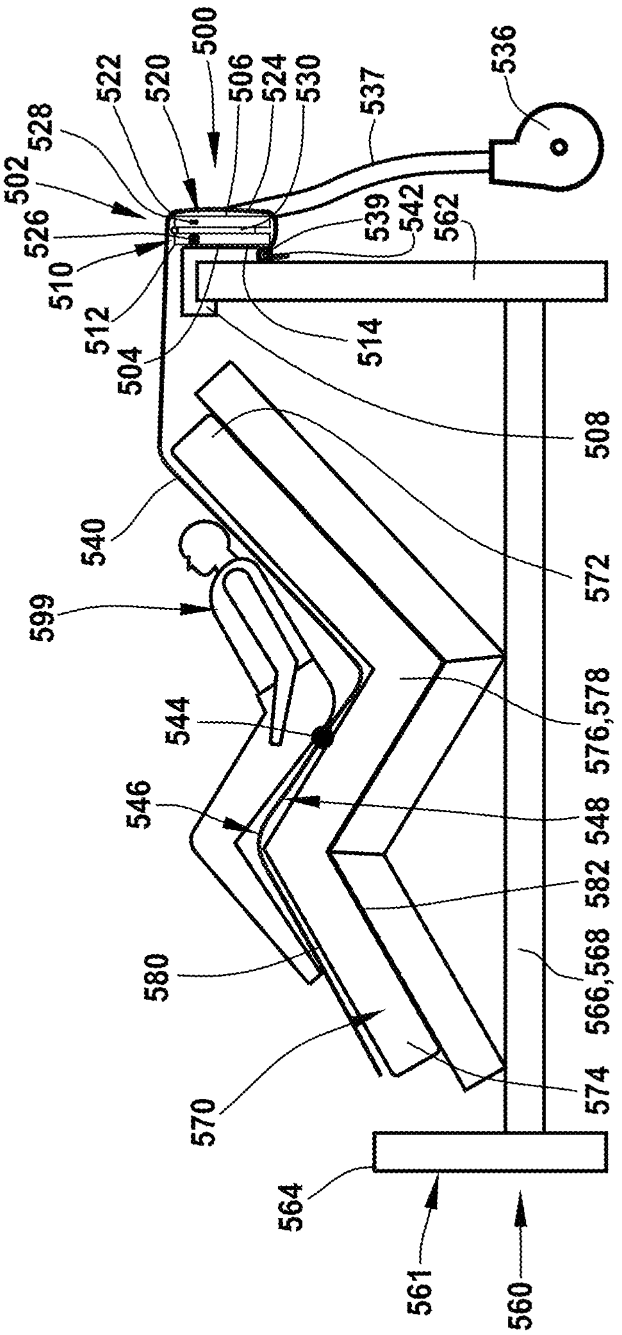
FIGS. 5A and 5B are side views of a device for moving a person on a bed, according to another implementation.
Figure 5B:
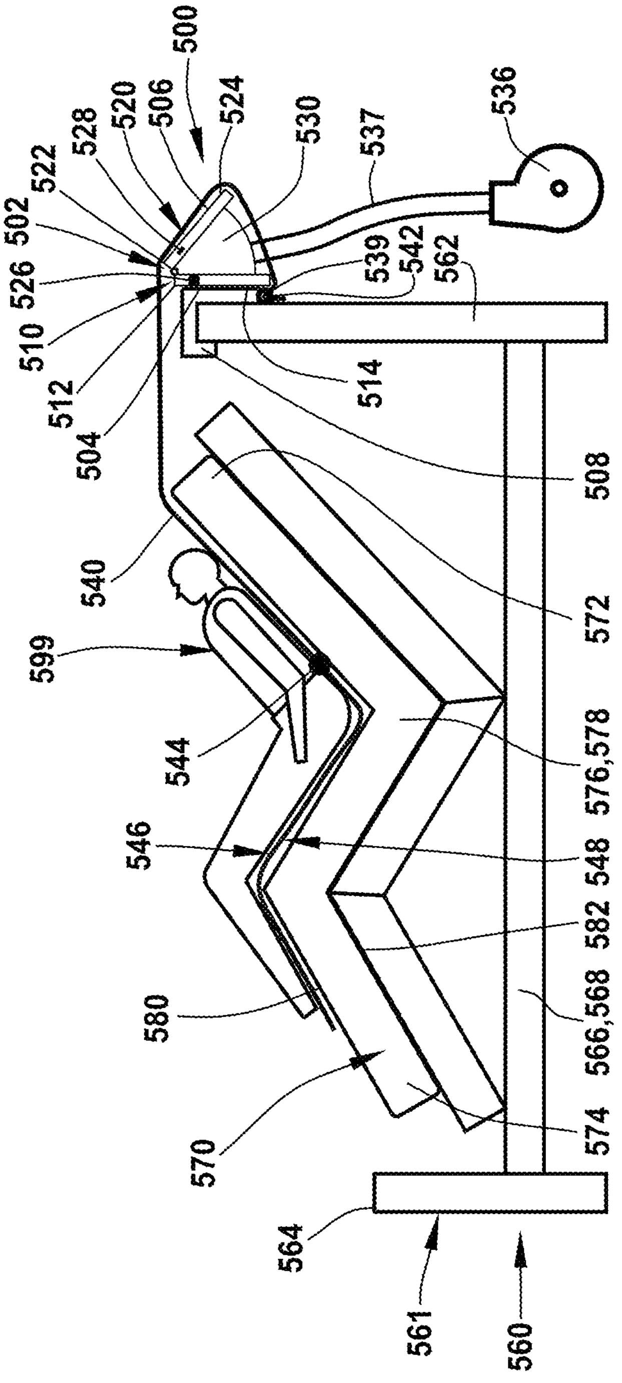

The device 100 also includes a sensor 126 coupled to the base 102 for determining the position of the expandable volume 130. The sensor 126 shown in FIGS. 1A and 1B is an ultrasonic distance sensor, and a tab 128 extends from the expandable volume 130 such that the sensor 126 can measure the distance between the sensor 126 and the tab 128. In other implementations, the sensor can be any other distance sensor, such as, an infrared sensor, an inductive sensor, a capacitive sensor, a photoelectric sensor, or any other sensor capable of measuring the distance of displacement of a portion of the expandable volume when the expandable volume is actuated from the first position to the second position, or vice versa. In other implementations, the sensor is an angular sensor, such as a rotary encoder, and the sensor is coupled to a rotating shaft (such as shaft 731 shown in FIGS. 7A and 7B) or a hinge (as shown in FIGS. 5A and 5B). In other implementations, the sensor is a pressure sensor disposed at least partially within an inflatable cushion or linear actuator type expandable volume.

In use, the expandable volume 130 begins in the first position. When the person 199 needs to be moved on the support apparatus 160 in the direction of the device 100, the pumping device 136 is powered to introduce pressurized air through a conduit 137 into the expandable volume 130. As the expandable volume 130 inflates, the expandable volume 130 moves to the second position. As the expandable volume 130 is actuated from the first position to the second position, the length of the sheet 140 extending from the second side 106 of the base 102 to the first side 104 of the base 102 is increased such that the second portion 144 of the sheet 140 is moved closer to the base 102 of the device 100 in the second position than in the first position. In other words, a length as measured from the second side 106 of the base 102, over the expandable volume 130, to the first side 104 of the base 102 is increased as the device is actuated from the first position to the second position. Because the second portion 144 of the sheet 140 is moved closer to the base 102 of the device 100 when the expandable volume 130 is actuated from the first position to the second position, the person 199 supported by the second portion 144 of the sheet 140 is also moved toward the device 100 such that the person 199 is boosted toward the head end 162 of the bed frame 161 and the head end 172 of the mattress 170.

Once the person 199 is moved to the desired position in the support apparatus 160, the expandable volume 130 is actuated from the second position back to the first position. For the device 100 shown in FIGS. 1A and 1B, the actuation of the expandable volume 130 from the second position to the first position includes releasing the pressure in the inflatable cushion such that the pressurized air within the inflatable cushion can flow out of the inflatable cushion. However, in other implementations, the pumping device is reversable, and the pumping device 136 can be actuated in reverse to suction the air from the inflatable cushion. If the patient's hips are approximately aligned with the hinge of the mattress and with sufficient friction between the person 199, the sheet 140, and the mattress 170, the person 199 will not immediately slide back away from the device 100 when the expandable volume 130 is actuated from the second position back to the first position. Although the sheet 140 of the device 100 shown in FIGS. 1A and 1B extends from the second side 106 of the base 102, over the expandable volume 130, to the first side 104 of the base 102, in some implementations, the sheet only extends from the second side of the base and over the expandable volume but does not extend to the first side of the base before extending toward and under the person. In these implementations, actuation of the expandable volume from the first position to the second position increases the length of the sheet as measured from the second side of the base to a point on the expandable volume where the sheet no longer contacts the expandable volume.

The device 100 includes a strain gauge 139 between the first portion 142 of the sheet 140 and the portion of the base 102 to which the first portion 142 of the sheet 140 is coupled. In some implementations, the strain gauge 139 is integrated into a portion of the sheet 140. When the person 199 is moved to the desired position in the support apparatus 160 and the expandable volume 130 is actuated from the second position back to the first position, it is desired that gravity causes the person 199 to slide back down the mattress 170 until the posterior of the person 199 is disposed on the mattress 170 such that the person 199 is prevented from further movement on the mattress 170. In this position, if the knee section of the bed 160 is properly elevated, the person's 199 hips are approximately in line with the hinge of the bed 160 on the mattress 170, which facilitates redistribution of pressure across the patient's body on the mattress 170. Because the patient is in the desired position, rather than out of the desired position such that the person 199 is supported by the friction of the sheet 140, the person 199 will not immediately further move or slide on the mattress 170 when the sheet 140 is moved toward the device 100. However, in some circumstances, gravity may not cause the person 199 to slide on the mattress to this desired position when the expandable volume 130 is actuated from the second position back to the first position, and the friction between the sheet 140 and the person 199 may prevent the person 199 from moving to the desired resting position. Over time, the force exerted on the back of the person 199 by the friction of the sheet 140 as the sheet 140 holds the person 199 can cause pressure sores. The pressure gauge 139 is configured to measure the strain being put on the sheet 140. The device 100 is configured to alert an assisting person when the strain measured by the strain gauge 139 is higher than a predetermined amount, indicating that the friction of the sheet 140 is holding an undesirable amount of the weight of the person 199. Thus, the strain a person 199 in the desired position puts on the sheet 140 is lower than the predetermined amount of strain.

In some implementations, the strain gauge 139 is configured to measure the strain on the sheet 140, and when the strain on the sheet 140 exceeds the predetermined amount of strain, the strain gauge 139 sends a signal to cause the expandable volume 130 to move from the first position to the second position to boost the person 199 in the support apparatus 160. When the expandable volume 130 moves from the second position to the first position such that the person 199 is in the desired position, as discussed above, the strain gauge 139 will measure a strain on the sheet 140 less than the predetermined amount. Over time, the person 199 may slide on the support apparatus 160, putting additional strain on the sheet 140. When the person 199 has moved far enough on the support apparatus 160 such that the strain on the sheet 140 exceeds the predetermined amount, the strain gauge 139 will send a signal, causing the expandable volume 130 to move from the first position to the second position to boost the person 199.

The sheet 140 shown in FIGS. 1A and 1B has a first side 146 for contacting the person 199 and a second side 148 opposite the first side 146 for contacting the mattress 170. The first side 146 of the sheet 140 is manufactured such that the relationship between the first side 146 of the sheet 140 and the skin of a person 199 has a first coefficient of friction, and the second side 148 of the sheet 140 is manufactured such that the relationship between the second side 148 of the sheet 140 and the mattress 170 has a second coefficient of friction. As discussed above, once the person 199 has been moved on the support apparatus 160, the expandable volume 130 is actuated from the second position back to the first position, which releases the tension in the sheet 140 between the device 100 and the person 199. The friction between the person 199 and the sheet 140, and the sheet 140 and the mattress 170, can prevent the person 199 from initially sliding back to the person's 199 prior position (i.e., away from the device 100). In some implementations, a second sheet (such as a fitted sheet) can be disposed between the sheet and the mattress to provide a consistent friction between the sheet and the bed.

As the person 199 moves in the support apparatus 160 over time, the person 199 may begin to slide on the support apparatus 160 away from the device 100. For repeated use of the device 100 for moving a person 199, low movement of the person 199 relative to the sheet 140 is desired such that subsequent actuation of the expandable volume 130 from the first position to the second position moves the person 199 back to the same position on the support apparatus 160 without the need for repositioning the sheet 140 under the person 199. Thus, for the sheet shown in FIGS. 1A and 1B, the first coefficient of friction between the first side 146 of the sheet 140 and the skin of the person 199 is higher than the second coefficient of the friction between the second side 148 of the sheet 140 and the mattress 170 such that the sheet 140 will slide along the mattress 170, rather than the person 199 sliding along the sheet 140. The sheet 140 shown in FIGS. 1A and 1B has a first coefficient of friction of 0.46 and a second coefficient of friction of 0.33. However, in other implementations, the first coefficient of friction can be any value greater than the second coefficient of friction. In some implementations, the second coefficient of friction is between 0.20 and 0.50. In some implementations, the second coefficient of friction is between 0.30 and 0.35.

Figures 2A, 2B, 2C:
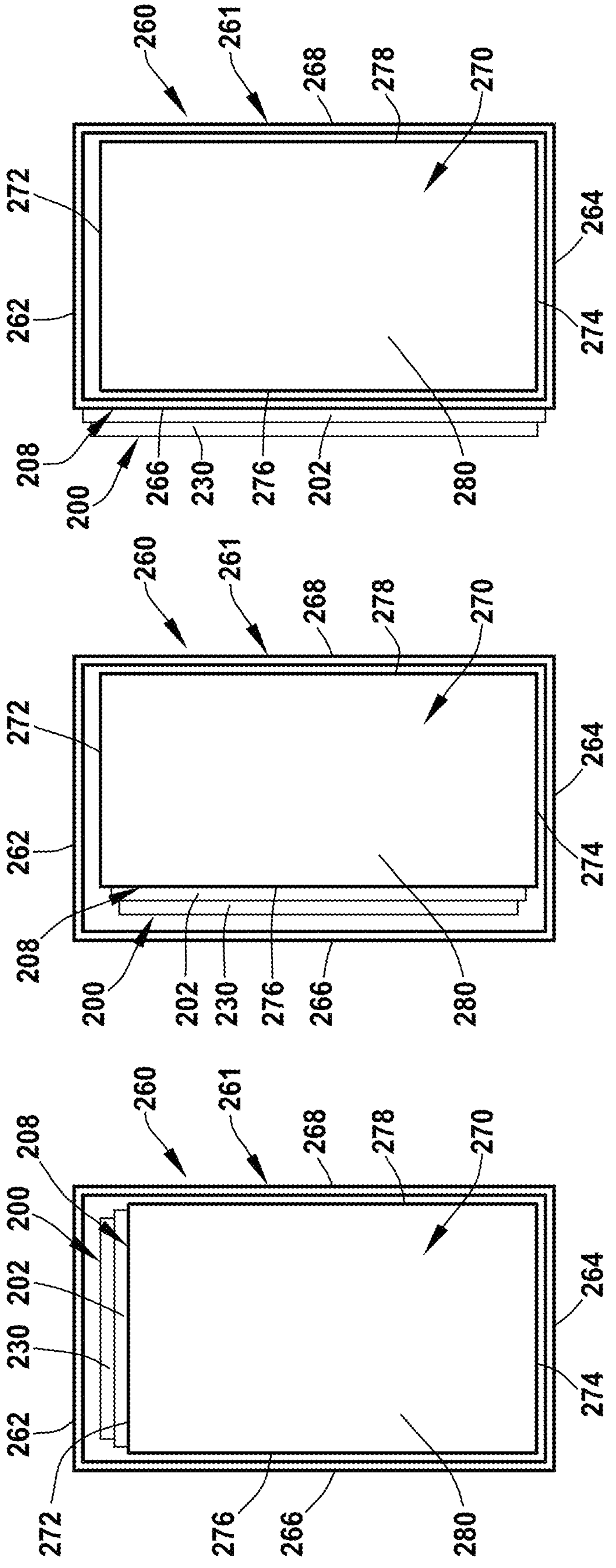
FIGS. 2A-2C are plan views of the device of FIGS. 1A and 1B coupled to different portions of the frame of a bed and the mattress of a bed.

FIGS. 2A-2C show top views of various ways in which the support apparatus coupler 208 of the device 200 can be coupled to different portions of a bed 260. FIG. 2A shows the support apparatus coupler 208 coupled to the head end 272 of the mattress 270 of the bed 260. FIG. 2B shows the support apparatus coupler 208 coupled to the side end 276 of the mattress 270 of the bed 260. FIG. 2C shows the support apparatus coupler 208 coupled to the side end 266 of the frame of the bed 260.

Figure 3B:
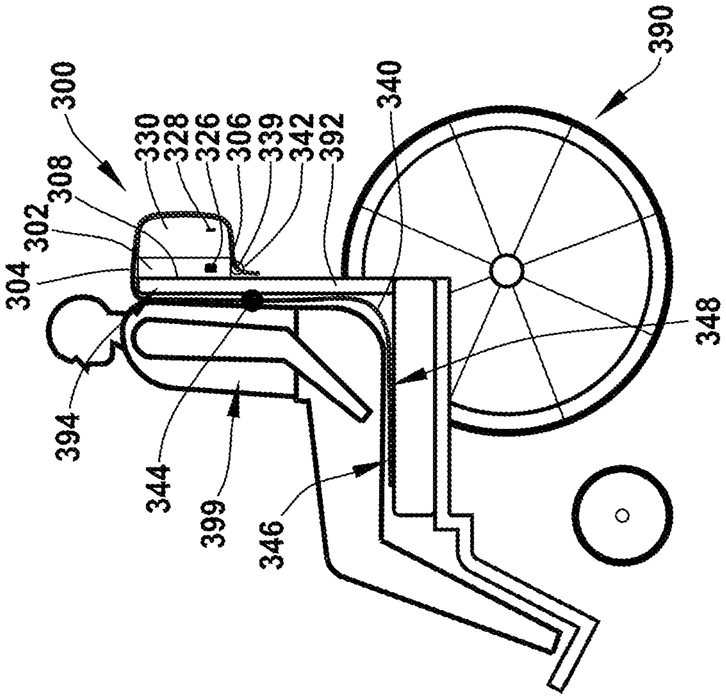
FIGS. 3A and 3B are side views of a device for moving a person in a wheel chair toward the top of the back support of the wheel chair, according to another implementation.
Figure 3A:
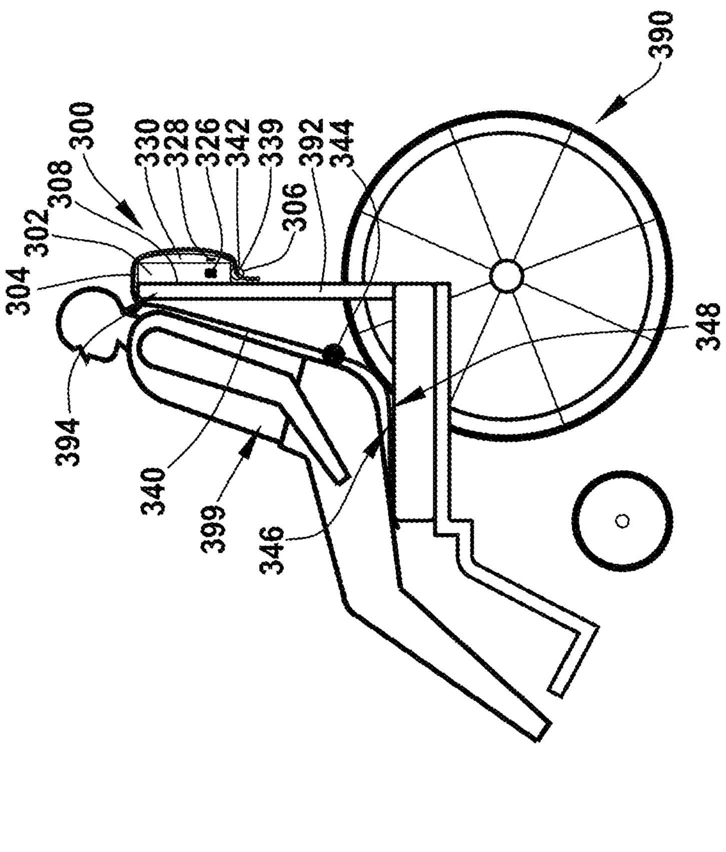

FIGS. 3A and 3B show a device 300 similar to the device 100 shown in FIG. 1, but the support apparatus 390 to which the device 300 in FIGS. 3A and 3B is coupled is a wheel chair 390. The support apparatus coupler 308 shown in FIGS. 3A and 3B is coupled to the back support 392 of the wheel chair 390 such that the sheet 340 extends over a top end 394 of the back support 392 and the second portion 344 of the sheet 340 supports the posterior of the person 399. In use, actuation of the expandable volume 330 from the first position (shown in FIG. 3A) to the second position (shown in FIG. 3B) causes the second portion 344 of the sheet 340 to move toward the device 300, causing the posterior of the person 399 to move toward the back support 392 and the back of the person 399 toward the top end 394 of the back support 392 of the wheel chair 390.

Figure 4:
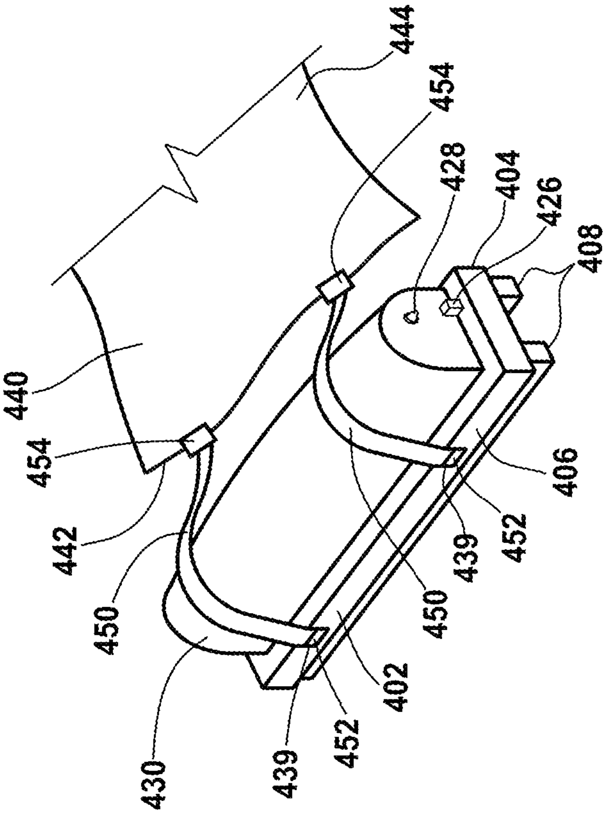
FIG. 4 is a perspective view of a device for moving a person on a bed toward the head end of the bed, according to another implementation.

FIG. 4 shows a device 400 similar to the device 100 shown in FIG. 1, but a sheet 440 is not directly coupled to the base 402 of the device 400 shown in FIG. 4. Instead, the base 402 of the device 400 includes a sheet coupler 450 for coupling the sheet 440 to the device 400. The sheet coupler 450 includes a web assembly having a first web assembly portion 452 coupled to the base 402 and a second web assembly portion 454 for affixing a sheet 440 to the base 402. The web assembly in FIG. 4 includes two straps that extend over the second side 406 of the base 402, over the expandable volume 430, and over the first side 404 of the base 402. The second web assembly portion 454 is coupled to a first portion 442 of a sheet 440, and the second portion 444 of the sheet 440 is supporting a person 499 (not shown). The web assembly functions as an extension of the sheet 440, allowing the device 400 to use a standard size sheet 440 and operate in the same way as described above with respect to the device 100 shown in FIG. 1. In some implementations, the second web assembly portion is coupled to a garment worn by the person, and actuation of the expandable volume moves the garment and person toward the device.

FIGS. 5A and 5B show another implementation of a device 500. The device 500 shown in FIGS. 5A and 5B is similar to the devices 200, 300, 400 shown in FIGS. 1-4, but the base 502 of the device 500 shown in FIGS. 5A and 5B includes a first base portion 510 rotatably coupled to a second base portion 520 with an expandable volume 530 disposed between the first base portion 510 and a second base portion 520. The first base portion 510 of the device 500 has a first end 512 and a second end 514 and includes the support apparatus coupler 508. The second base portion 520 also has a first end 522 and a second end 524. The first end 522 of the second base portion 520 is pivotably coupled to the first end 512 of the first base portion 510. The expandable volume 530 is disposed between the first base portion 510 and the second base portion 520 such that the second base portion 520 pivots relative to the first base portion 510 when the expandable volume 530 actuates from the first position to the second position. The first base portion 510 and the second base portion 520 of the device 500 shown in FIGS. 5A and 5B are pivotably coupled by a hinge, but in other implementations, the first base portion and the second base portion are pivotably coupled by any linkage capable of allowing the first and second base portions to pivot relative to each other while withstanding the forces exerted on the base during operation.

The first base portion 510 of the device 500 includes the first side 504, and the second base portion 520 includes the second side 506. The sheet 540 included in the device 500 in FIGS. 5A and 5B extends over the second side 506 of the second base portion 520, over the expandable volume 530, and over the first side 504 of the first base portion 510. Although the sheet 540 extends over the expandable volume 530 in this implementation, the sheet 540 in FIG. 5 does not contact the expandable volume 530 in either the first position or the second position. However, in some implementations, the sheet does contact the expandable volume in the first position, the second position, or both. The inclusion of the first base portion and the second base portion allow the expandable volume disposed between the first base portion and the second base portion to expand more evenly, and thus more predictably, than in the other implementations of the device shown in FIGS. 1-4. This configuration also allows the device 500 to be mounted in different locations on, and at different angles relative to, the support apparatus 560.

When the expandable volume 530 is actuated from the first position (shown in FIG. 5A) to the second position (shown in FIG. 5B), the expandable volume 530 causes the second base portion 520 to pivot relative to the first base portion 510 at the first end 522 of the second base portion 520, increasing the length of the portion of sheet 540 as measured from the second side 506, over the expandable volume 530, to the first side 504. Because of the increase in length of this portion of sheet 540, the second portion 544 of the sheet 540, and the person 599 supported by the second portion 544 of the sheet 540, are moved closer to the device 500.

Figure 6A:
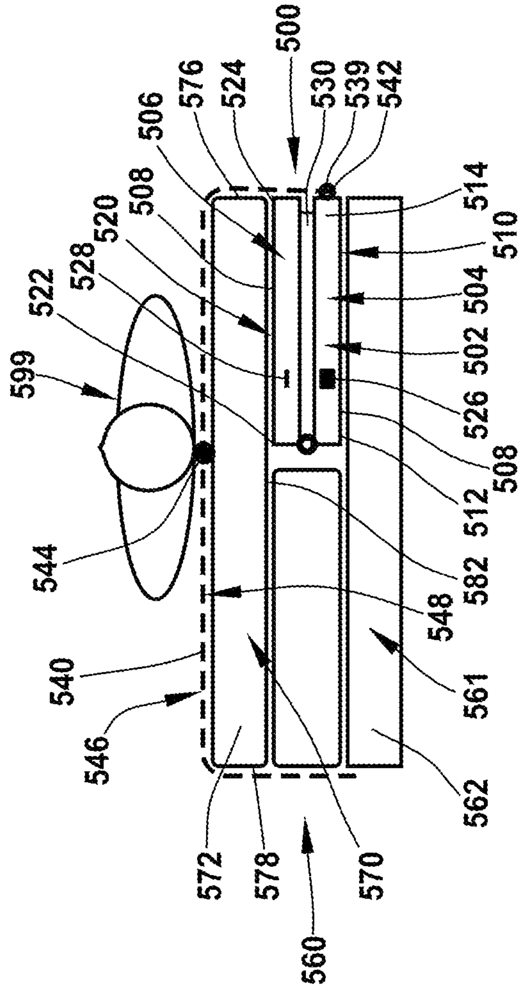
FIGS. 6A and 6B are end views of a device for moving and turning a person on a bed, according to the implementation of FIG. 5.
Figure 6B:
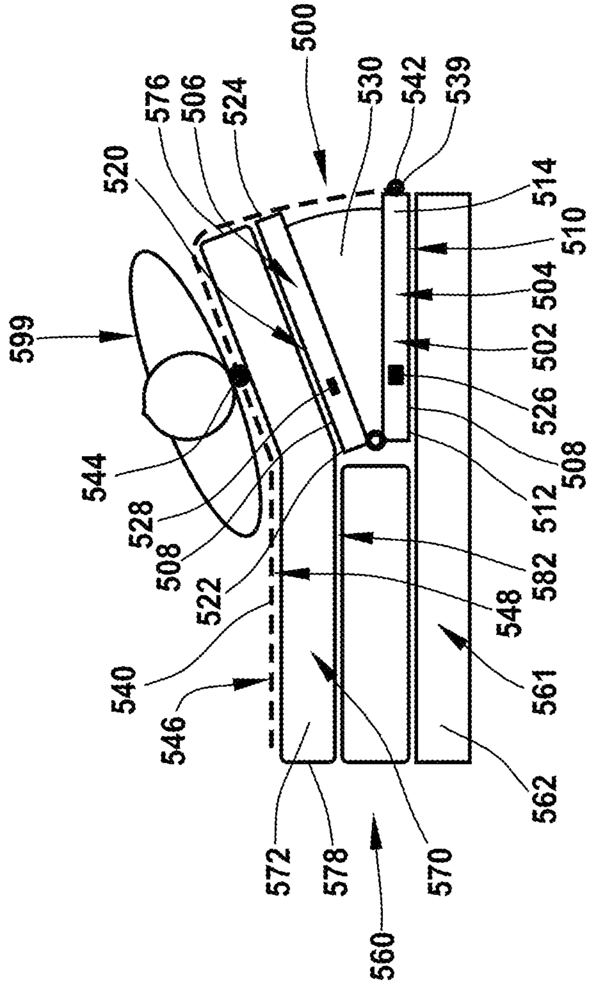

FIGS. 6A and 6B show the same device 500 shown in FIGS. 5A and 5B, but in FIGS. 6A and 6B, the device 500 is disposed at the side end 576 of a mattress 570 of a bed 560 to allow a person 599 to be easily turned on the person's side. As seen in FIG. 6A, some people 599 are too wide, and the bed 560 too narrow, to be fully turned directly on the person's 599 side in a comfortable manner. Thus, to have enough space to turn the person 599 on the person's 599 side, a person 599 must be moved toward one of the side ends 576, 578 of the mattress 570 before or concurrently with being turned in the direction of the opposite side end 576, 578 of the mattress 570.

The device 500 shown in FIGS. 6A and 6B is disposed adjacent the bottom surface 582 of the mattress 570 between the mattress 570 and the bed frame such that the second base portion 520 of the device 500 is in contact with the bottom surface 582 of the mattress 570. The support apparatus coupler 508 of the device 500 shown in FIGS. 6A and 6B is a friction coating disposed on the outer surfaces of the first base portion 510 and the second base portion 520. The friction between the bottom surface 582 of the mattress 570 and the device 500 and the friction between the bed frame 561 and the device 500 are sufficient to couple the device 500 to the bed 560. However, in other implementations, the support apparatus coupler includes a sleeve that securely fits over the side end of the bed frame, one or more straps that fit around the side end of the bed frame, one or more ratcheting straps that fit around the side end of the bed frame, one or more hook and loop strips, fasteners, a sewn stitch connecting to the side end of the bed frame, a friction coating, an adhesive, or any other coupler capable of keeping the device coupled to the support apparatus when overcoming the forces applied to the device when the device is moving a person on the support apparatus. In some implementations, the support apparatus coupler is coupled to or integral with the mattress of the bed. As described with respect to FIGS. 5A and 5B, when the expandable volume 530 of the device 500 is actuated from the first position (shown in FIG. 6A) to the second position (shown in FIG.

6B), the device 500 moves the second portion 544 of the sheet 540 toward the side end 576 of the mattress 570 where the device 500 is located. However, because the device 500 is disposed on the bottom surface 582 of the mattress 570, actuation of the expandable volume 530 from the first position to the second position raises the side end 576 portion of the mattress 570 disposed directly above the device 500. Thus, as the device 500 causes the side end 576 of the mattress 570 to rise with respect to the bed frame, creating an incline in the mattress 570, the second portion 544 of the sheet 540 moves up the incline in the mattress 570 toward the side end 576 of the mattress 570 where the device 500 is disposed. Because the second portion 544 of the sheet 540 is supporting the person 599, the person 599 is moved up the inclined side end 576 of the mattress 570. Once the person 599 is moved toward the side end 576 of the mattress 570, enough space exists to turn the person 599 toward the other side end 578 of the mattress 570. Because the person 599 has been moved onto the inclined portion of the mattress 570, the person 599 can easily be turned onto the person's 599 side.

Although FIGS. 6A and 6B show a device 500 having a first base portion 510 and a second base portion 520 hingedly coupled around the expandable volume 530, in other implementations, the expandable volume has only a single base like the expandable volume 130 of device 100 shown in FIGS. 1A and 1B. Such a device can be disposed adjacent the bottom surface of the mattress between the mattress and the bed frame such that the expandable volume of the device is in contact with the bottom surface of the mattress.

Figure 9B:
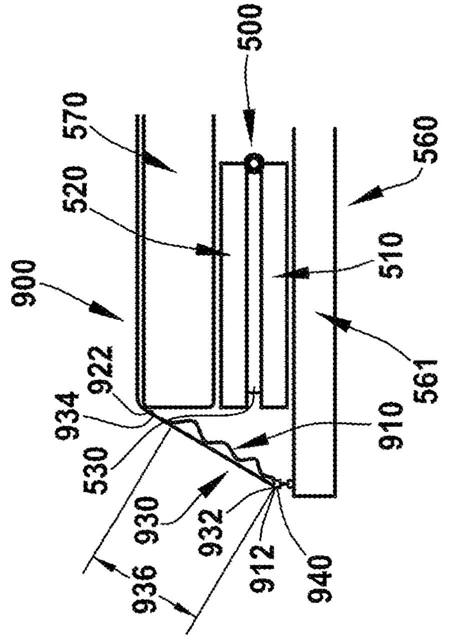
FIGS. 9B and 9C are detail views of the first elastic strip of the sheet of FIG. 9A.
Figure 9C:
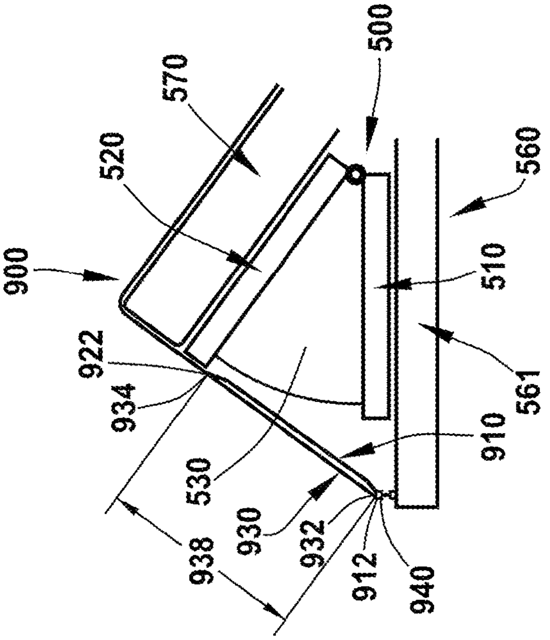
Figure 9A:
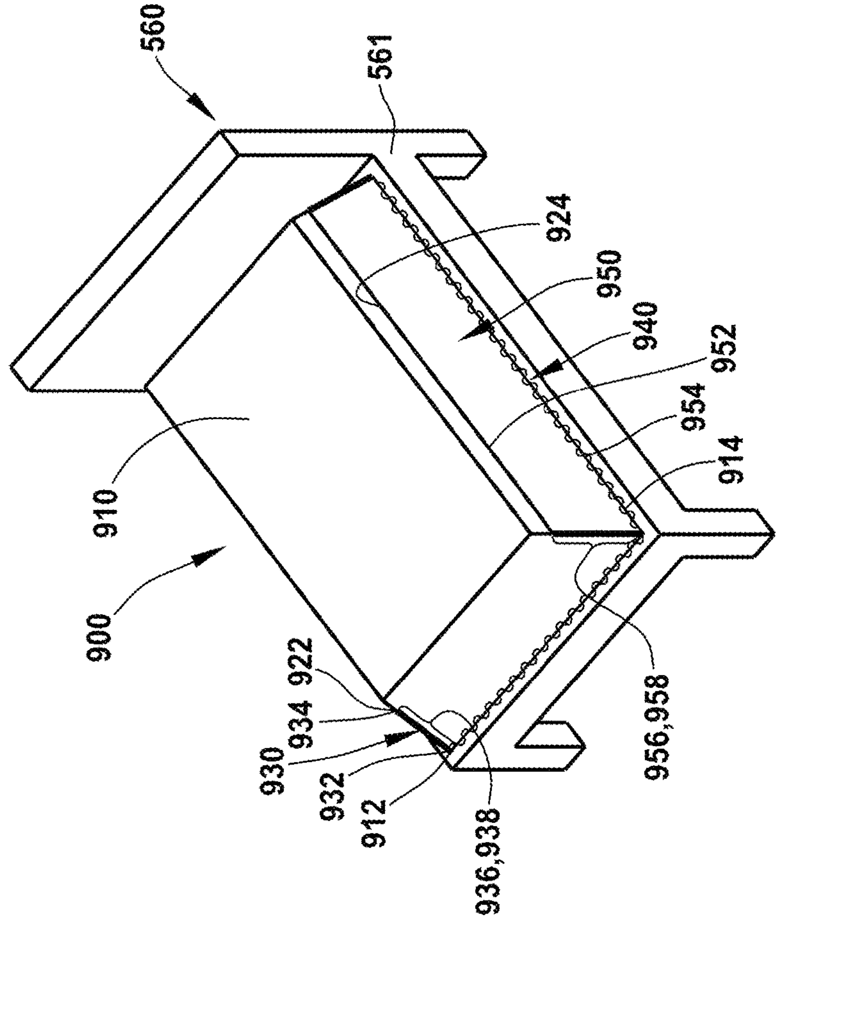
FIG. 9A is a perspective view of a sheet for being coupled to the device for moving a person on a bed shown in FIGS. 6A and 6B, according to one implementation.

FIGS. 9A-9C shows a sheet 900 for use with the device 500 for moving a person on a support apparatus shown in FIGS. 6A and 6B. The sheet 900 has a main body 910, a first elastic strip 930, and a second elastic strip 950. The elastic strips 930, 950 are disposed along the sides of the sheet 900 and allow for the sheet 900 to expand when the device 500 is actuated from the first position to the second position. When the device 500 is actuated from the second position back to the first position, the resilient elastic strips 930, 950 retract the main body 910 of the sheet 900 back to the relaxed position, shifting the sheet 900 back to its original position rather than allowing the sheet 900 to stay shifted to one side of the bed 560.

The main body 910 of the sheet 900 has a first sheet edge 912 and a second sheet edge 914 spaced apart and opposite from the first sheet edge 912. The first sheet edge 912 and the second sheet edge 914 are configured to be disposed adjacent the side ends 576, 578 of the bed 560.

The main body 910 of the sheet 900 includes a coupler 940, shown in FIG. 9A as a half of a zipper, extending along the edge 912, 914 of the main body 910. The coupler 940 of the main body 910 is configured such that the main body 910 of the sheet 900 can be coupled to another half of a zipper affixed to the frame 561 of the bed 560. Although the coupler 940 shown in FIG. 9A is a zipper, in other implementations, the coupler is by one or multiple fasteners, including hook and loop, an adhesive, a button/loop, straps, or any other coupling device capable of keeping the main body of the first sheet edge and second sheet edge stationary relative to the bed frame. In some implementations, only the first sheet edge and the second sheet edge include couplers. Although the coupler 940 in FIG. 9A-9C is shown coupled to a portion of the frame 561 of the bed 560, in other implementations, the coupler is coupled to at least a portion of the device, the mattress, the support apparatus, or any other object such that the edges of the main body are stationary with respect to the first and second elastic strips.

The first elastic strip 930 has a first edge 932 and a second edge 934 spaced apart and opposite the first edge 932, and the second elastic strip 950 has a first edge 952 and a second edge 954 spaced apart and opposite the first edge 952. The first and second elastic strips 930, 950 are made from spandex, but in other implementations, the first and second elastic strips are made of any elastic fabric. The first and second elastic strips 930, 950 are resiliently biased toward a relaxed position and urgeable to an extended position. The first edge 932 of the first elastic strip 930 is coupled to the first sheet edge 912, and the second edge 934 of the first elastic strip 930 is coupled to a first portion 922 of the main body 910. Similarly, the second edge 954 of the second elastic strip 950 is coupled to the second sheet edge 914, and the first edge 952 of the second elastic strip 950 is coupled to a second portion 924 of the main body 910.

When the first elastic strip 930 is in the relaxed position (as shown in FIG. 9B), the first relaxed width 936, as measured between the first edge 932 and second edge 934 of the first elastic strip 930, is less than the distance between the first sheet edge 912 and the first portion 922 of the main body 910. When the first elastic strip 930 is in the extended position (as shown in FIG. 9C), the first extended width 938, as measured between the first edge 932 and second edge 934 of the first elastic strip 930, is equal to the distance between the first sheet edge 912 and the first portion 922 of the main body 910 such that the main body 910 of the sheet 900 prevents the first elastic strip 930 from being urged beyond the first extended position. Similarly, when the second elastic strip 950 is in the relaxed position, the second relaxed width 956, as measured between the first edge 952 and second edge 954 of the second elastic strip 950, is less than the distance between the second sheet edge 914 and the second portion 924 of the main body 910. When the second elastic strip 950 is in the extended position, the second extended width 958, as measured between the first edge 952 and second edge 954 of the second elastic strip 950, is equal to the distance between the second sheet edge 914 and the second portion 924 of the main body 910 such that the main body 910 of the sheet 900 prevents the second elastic strip 950 from being urged beyond the second extended position.

In FIGS. 9B and 9C, the distance between the first sheet edge 912 and the first portion 922 of the main body 910 is double the first relaxed width 936 of the first elastic strip 930, and the distance between the second sheet edge 914 and the second portion 924 of the main body 910 is double the second relaxed width 956 of the second elastic strip 950. However, in other implementations, the relative widths of the first relaxed width versus the distance between the first sheet edge and the first portion of the main body, and the relative widths of the second relaxed width versus the distance between the second sheet edge and the second portion of the main body, can be any desired ratio such that the sheet can extend when the device moves from the first position to the second position.

Figure 10:
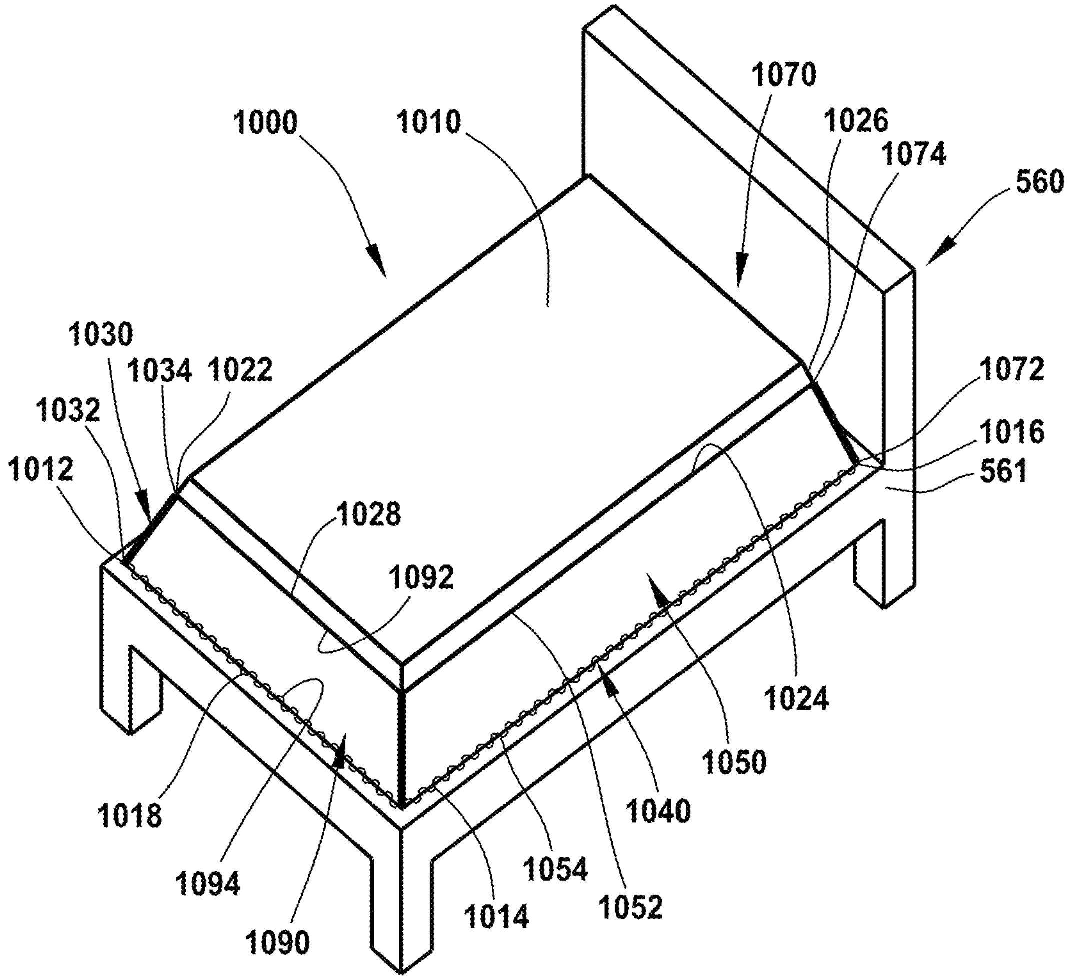
FIG. 10 is a perspective view of a sheet for being coupled to the device for moving a person on a bed shown in FIGS. 6A and 6B, according to another implementation.

FIG. 10 shows a sheet 1000 including a first elastic strip 1030 and second elastic strip 1050 similar to the first elastic strip 930 and second elastic strip 950 of sheet 900 shown in FIGS. 9A-9C. However, the sheet 1000 shown in FIG. 10 further includes a third elastic strip 1070 and a fourth elastic strip 1090. Because the sheet 1000 includes features similar to the sheet 900 shown in FIGS. 9A-9C, features of sheet 1000 are indicated using similar reference numbers.

The third elastic strip 1070 has a first edge 1072 and a second edge 1074 spaced apart and opposite the first edge 1072, and the fourth elastic strip 1090 has a first edge 1092 and a second edge 1094 spaced apart and opposite the first edge 1092. The third and fourth elastic strips 1070, 1090 are made from spandex, but in other implementations, the third and fourth elastic strips are made of any elastic fabric. The third and fourth elastic strips 1070, 1090 are resiliently biased toward a relaxed position and urgeable to an extended position. The first edge 1072 of the third elastic strip 1070 is coupled to the third sheet edge 1016, and the second edge 1074 of the third elastic strip 1070 is coupled to a third portion 1026 of the main body 1010. Similarly, the second edge 1094 of the fourth elastic strip 1090 is coupled to the fourth sheet edge 1018, and the first edge 1092 of the fourth elastic strip 1090 is coupled to a fourth portion 1028 of the main body 1010.

When the first or second elastic strip 1030, 1050 is urged to the extended position, the third and fourth elastic strips 1070, 1090 are able to extend to allow the main body 1010 of the sheet 1000 to shift toward a side of the bed 560 without the third sheet edge 1016 or the fourth sheet edge 1018 wrinkling.

For both the sheet 900 shown in FIGS. 9A-9C and for the sheet 1000 shown in FIG. 10, a fitted sheet can be disposed over the sheet 900, 1000 to act as a protective layer between the person and the sheet 900, 1000. The fitted sheet can include a drawstring around the perimeter to secure the fitted sheet onto the mattress 570 and/or bed 560 when the devices disclosed herein are actuated to move the mattress 570 and/or the sheet 900, 1000. However, a standard fitted sheet having elastic around the perimeter could be used as well.

Figure 11A:
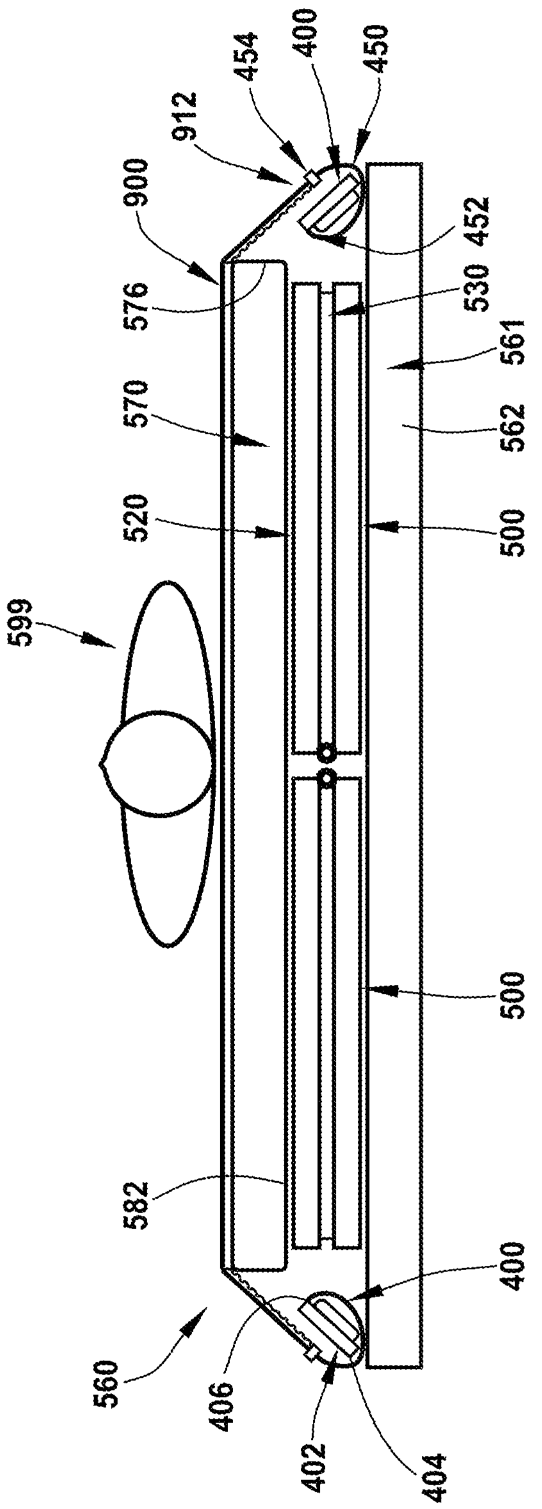
FIGS. 11A and 11B are end views of a device for moving and turning a person on a bed, according to the implementation of FIGS. 6A and 6B, and including the device for moving a person on a bed shown in FIG. 4 and the sheet shown in FIGS. 9A-9C.
Figure 11B:
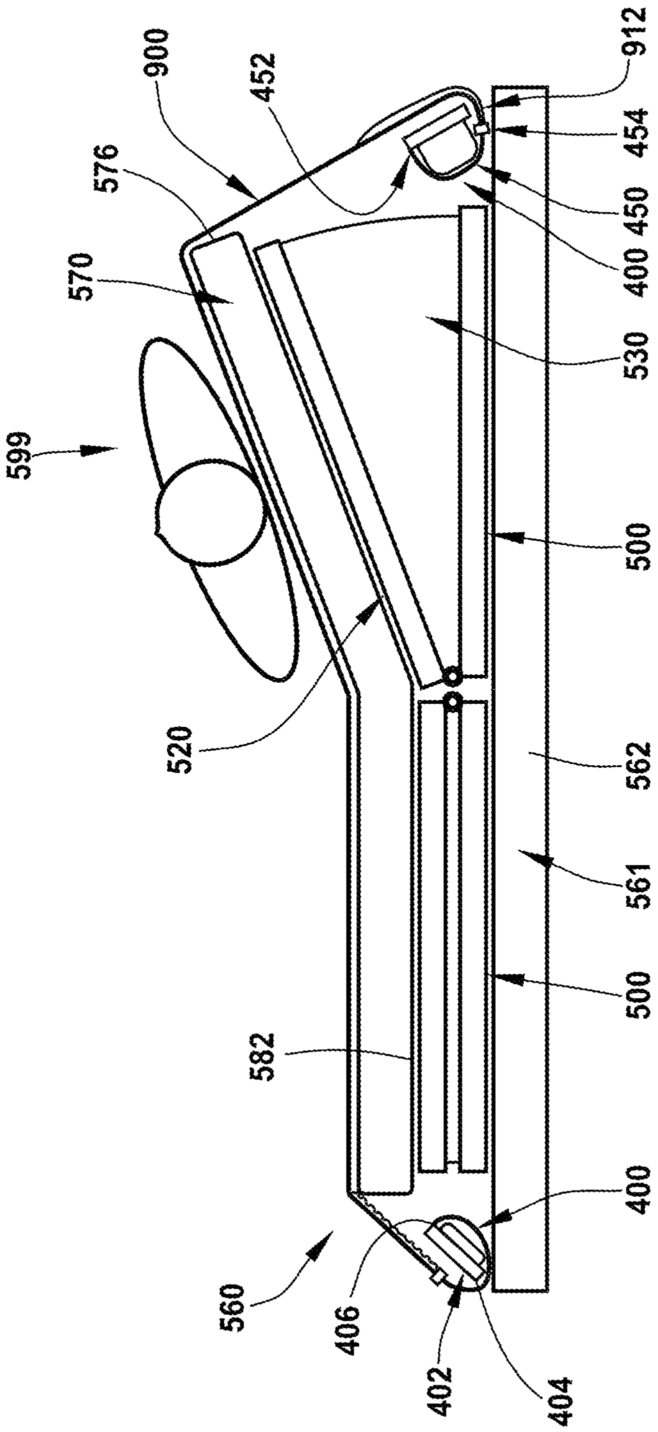

FIGS. 11A and 11B show two of the devices 500 as shown in FIGS. 6A and 6B being used with the sheet 900 shown in FIGS. 9A and 9C and two of the devices 400 shown in FIG. 4. One of the devices 500 is disposed adjacent the bottom surface 582 of the side end 576 of the mattress 570 between the mattress 570 and the bed frame 561 such that the second base portion 520 of the device 500 is in contact with the bottom surface 582 of the mattress 570. The other of the devices 500 is disposed adjacent the bottom surface 582 of the side end 578 of the mattress 570 between the mattress 570 and the bed frame 561 such that the second base portion 520 of the device 500 is in contact with the bottom surface 582 of the mattress 570. However, the first and second sheet edges 912, 914 of sheet 900 are not coupled to the devices 500 as shown in FIGS. 6A and 6B or to the bed frame 561 as shown in FIGS. 9A-9C. In FIGS. 11A and 11B, the first and second sheet edges 912, 914 of sheet 900 are coupled to the two devices 400 via sheet couplers 450.

As shown in detail in FIG. 4, the sheet couplers 450 each include a web assembly having a first web assembly portion 452 coupled to the base 402 and a second web assembly portion 454 for affixing the sheet 900 to the base 402. The web assembly in FIGS. 11A and 11B includes multiple straps that extend over the second side 406 of the base 402, over the expandable volume 430, and over the first side 404 of the base 402. The second web assembly portion 454 is coupled to first sheet edge 912 of sheet 900.

Because the sheet 900 includes the first and second elastic strips 930, 950, the sheet 900 is urged to the expanded position, as shown in FIGS. 9B and 9C, when one of the devices 500 is actuated from the first position to the second position, as shown in FIGS. 11A and 11B. Normally, rather than pulling the sheet 900 as the device is actuated, the sheet 900 is allowed to stretch and the main body 910 remains stationary relative to the mattress 570. However, the device 400 coupled adjacent the side end 576 of the mattress 570 is coupled to the first sheet edge 912 of the sheet 900 such that, when actuated from the first position to the second position contemporaneously with the actuation of device 500, device 400 pulls the first sheet edge 912 to remove any slack created by the first elastic strip 930 of the sheet 900. However, the second elastic strip 950 is still able to expand to create slack at the opposite edge of the sheet 900 such that the main body 910 of the sheet 900 can slide the person 599 in the bed 560.

Although FIGS. 11A and 11B include devices 500 for lifting portions of the mattress 570, other implementations include any other devices for moving a person on a support apparatus disclosed herein to lift portions of the mattress. Although FIGS. 11A and 11B include devices 400 for pulling the sheet 900, other implementations include any other devices for moving a person on a support apparatus disclosed herein to pull the sheet. In some implementations, rather than using the device 400 to pull the sheet 900, a roller rotatably coupled to a motor can be included for winding the sheet around the roller to pulling the sheet. Although FIGS. 11A and 11B include the sheet 900, other implementations can include the sheet 1000 disclosed in FIG. 10.

Figure 12A:
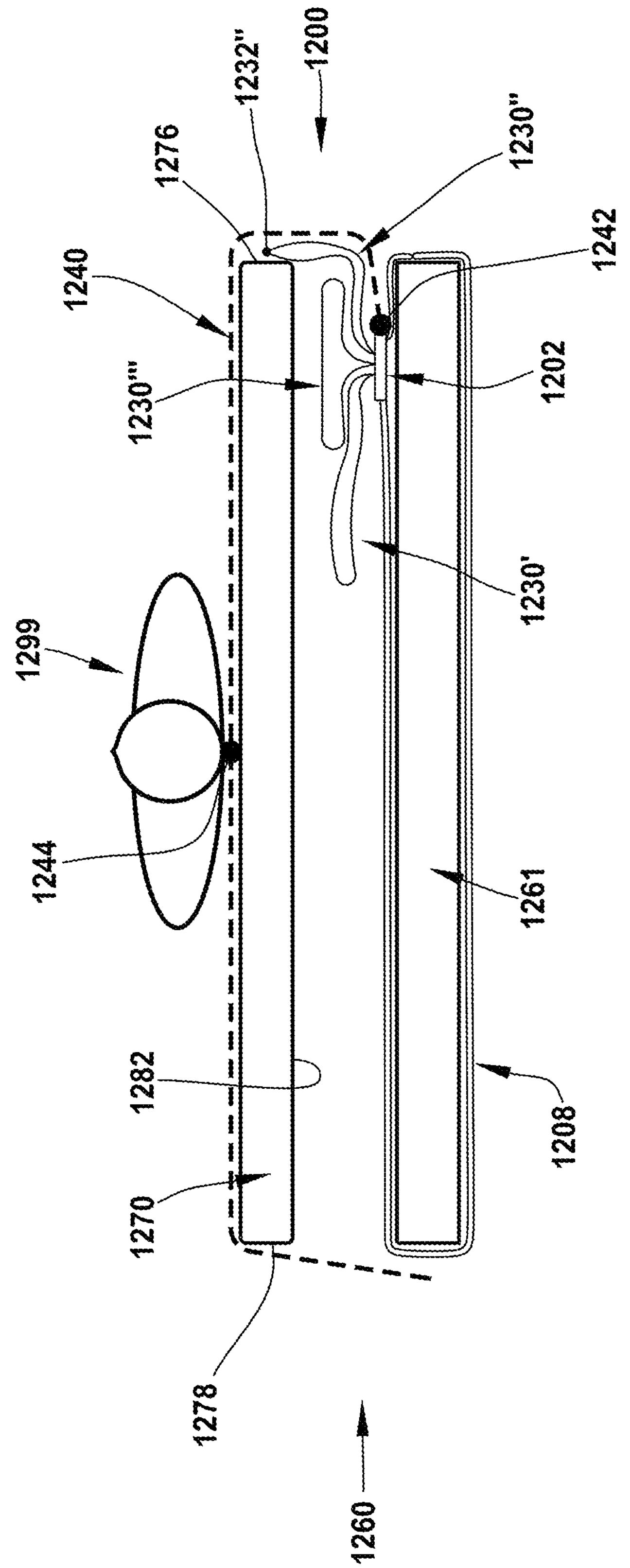
FIGS. 12A and 12B are end views of a device for moving and turning a person on a bed, according to another implementation.
Figure 12B:
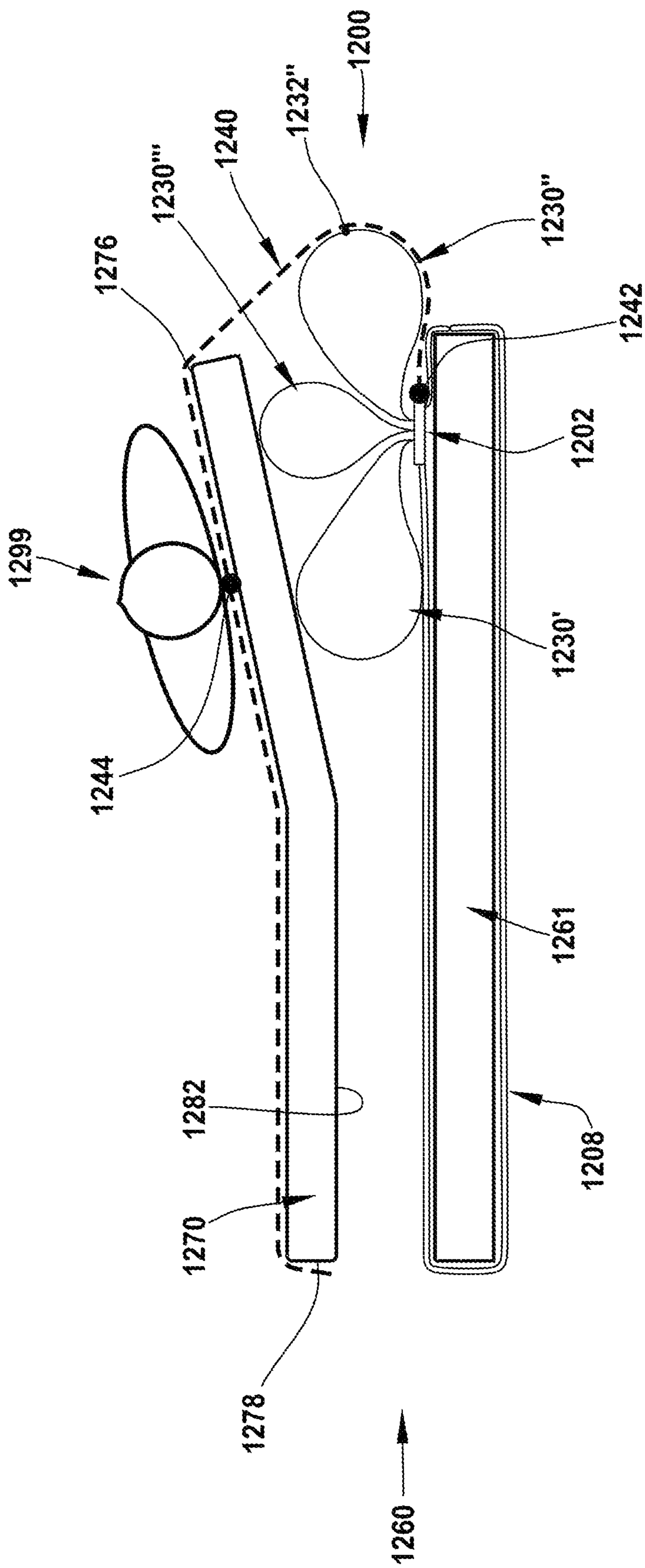

FIGS. 12A and 12B show an implementation of a device 1200 for disposing at the side end 1276 of a mattress 1270 of a bed 1260 to allow a person 1299 to be easily turned on the person's side. As seen in FIG. 12A, some people 1299 are too wide, and the bed 1260 too narrow, to be fully turned directly on the person's 1299 side in a comfortable manner. Thus, to have enough space to turn the person 1299 on the person's 1299 side, a person 1299 must be moved toward one of the side ends 1276, 1278 of the mattress 1270 before or concurrently with being turned in the direction of the opposite side end 1276, 1278 of the mattress 1270.

The device 1200 includes a base 1202 and three expandable volumes 1230. The base 1202 shown in FIGS. 12A and 12B is a strap manufactured from a flexible woven material, but in other implementations, the base is manufactured from any other flexible material, such as a thin material, or a rigid material. A first portion 1242 of a sheet 1240 is coupled to the base 1202 and a second portion 1244 of the sheet 1240 is wrapped over the side end 1276 of the mattress 1270 and over a top of the mattress 1270.

The support apparatus coupler 1208 is coupled to the base 1202. The support apparatus coupler 1208 couples the device 1200 to a portion of the bed 1260 such that the device 1200 is anchored to the bed 1260 and does not move relative to bed 1260 when the device 1200 is used. The support apparatus coupler 1208 shown in FIGS. 12A and 12B includes a strap for coupling the device 1200 around the bed frame 1261, as discussed below. However, in other implementations, the support apparatus coupler includes a sleeve that securely fits over the head end of the bed frame, one or more clamps, one or more ratcheting straps that fit around the head end of the bed frame, one or more hook and loop strips, fasteners, a sewn stitch connecting to the head end of the bed frame, a friction coating, an adhesive, or any other coupler capable of keeping the device coupled to the support apparatus when overcoming the forces applied to the device when the device is moving a person on the support apparatus and lifting a portion of the mattress, as discuss in more detail below.

The device 1200 includes an inner expandable volume 1230', an outer expandable volume 1230", and a middle expandable volume 1230'".

The inner expandable volume 1230' is disposed between the bottom surface 1282 of the mattress 1270 between the mattress 1270 and the bed frame 1261 such that the inner expandable volume 1230' of the device 1200 is in contact with the bottom surface 1282 of the mattress 1270. When the inner expandable volume 1230' of the device 1200 is actuated from the first position (shown in FIG. 12A) to the second position (shown in FIG. 12B), the inner expandable volume 1230' of the device 1200 moves the second portion 1244 of the sheet 1240 toward the side end 1276 of the mattress 1270 where the device 1200 is located. However, because the device 1200 is disposed on the bottom surface 1282 of the mattress 1270, actuation of the inner expandable volume 1230' from the first position to the second position raises the side end 1276 portion of the mattress 1270 disposed directly above the device 1200. Thus, as the inner expandable volume 1230' of the device 1200 causes the side end 1276 of the mattress 1270 to rise with respect to the bed frame 1261, creating an incline in the mattress 1270, the second portion 1244 of the sheet 1240 moves up the incline in the mattress 1270 toward the side end 1276 of the mattress 1270 where the device 1200 is disposed. Because the second portion 1244 of the sheet 1240 is supporting the person 1299, the person 1299 is moved up the inclined side end 1276 of the mattress 1270.

The outer expandable volume 1230" acts as a cam to increase the distance as measured from the base 1202, over the outer expandable volume 1230", to a portion 1232" of the outer expandable volume 1230" when the outer expandable volume 1230" is actuated from a first position (shown in FIG. 12A) to a second position (shown in FIG. 12B). When the outer expandable volume 1230" is actuated from a first position to a second position, the outer expandable volume 1230" increases the volume of the of space between the sheet 1240 and the base 1202 such that the distance as measured from the base 1202, over the outer expandable volume 1230", to the portion 1232" of the outer expandable volume 1230" increases. Thus, the outer expandable volume 1230" acts as a cam to create a longer distance for the sheet 1240 to travel around the outer expandable volume 1230". The outer expandable volume 1230" can be coupled to the base 1202 of the device 1200 in any way capable of holding the outer expandable volume 1230" stationary relative to the base 1202, such as one or more stitches, buttons, a zipper, adhesive, or fasteners. The outer expandable volume 1230" shown in the illustrated implementations of FIGS. 12A and 12B as an inflatable cushion. The outer expandable volume 1230" is actuatable between a first position (shown in FIG. 12A), wherein the inflatable cushion is in a deflated state, and a second position (shown in FIG. 12B), wherein the cushion is fully inflated. However, in other implementations, the first position and the second position are any other states of expansion possible with the outer expandable volume. As the outer expandable volume 1230" actuates from the first position to the second position, the device 1200 moves the second portion 1244 of the sheet 1240 further toward the side end 1276 of the mattress 1270 where the device 1200 is located as the inner expandable volume 1230' lifts the side end 1276 of the mattress 1270.

The middle expandable volume 1230'" is coupled to the base 1202 between, and disposed between, the inner expandable volume 1230' and the outer expandable volume 1230". When the middle expandable volume 1230' of the device 1200 is actuated from the first position (shown in FIG. 12A) to the second position (shown in FIG. 12B), the middle expandable volume 1230'" applies pressure to the inner expandable volume 1230' and the outer expandable volume 1230" to force them into the desired positions. Because the middle expandable volume 1230'" is disposed under the mattress 1270, the middle expandable volume 1230'" also helps further raise the side end 1276 portion of the mattress 1270 disposed directly above the device 1200.

Although the inner expandable volume 1230', outer expandable volume 1230", and middle expandable volume 1230'" shown in FIGS. 12A and 12B are show being actuated from the first position to the second position at the same time, in some implementations, the inner expandable volume, outer expandable volume, and middle expandable volume are inflated at different times to stage their individual functions as desired. Although the inner expandable volume 1230', outer expandable volume 1230", and middle expandable volume 1230'" shown in FIGS. 12A and 12B are each inflatable devices, in other implementations, the inner expandable volume, outer expandable volume, and middle expandable volume are any other type of expandable volume disclosed herein.

Once the person 1299 is moved toward the side end 1276 of the mattress 1270, enough space exists to turn the person 1299 toward the other side end 1278 of the mattress 1270. Because the person 1299 has been moved onto the inclined portion of the mattress 1270, the person 1299 can easily be turned onto the person's 1299 side. After the device 1200 has been actuated once, the device 1200 can be deactivated to return the sheet 1240 and mattress 1270 to their original positions. The device 1200 can be actuated a plurality of times to continue to further turn the person 1299.

Although FIGS. 12A and 12B show only one device 1200 disposed under the side end 1276 of the mattress 1270, in some implementations, a second device 1200 is included under the other side end 1278 of the mattress 1270 such that the person can easily turned in the other direction.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A device for moving a person on a support apparatus, the device comprising:

a base having a first side and a second side opposite and spaced apart from the first side, the base being separate from the support apparatus and having a support apparatus coupler for coupling the device to a portion of a support apparatus adjacent a head end of the support apparatus;

an expandable volume disposed on a surface of the base between the first side and the second side, the expandable volume being actuatable from a first position to a second position; and a sheet having a first portion and a second portion opposite and spaced apart from the first portion, the second portion for supporting a patient, the first portion of the sheet being coupled to the base, wherein the sheet extends from the first portion, over the second side, over the expandable volume, and over the first side, wherein actuation of the expandable volume from the first position to the second position increases a length of the sheet extending from the second side of the base to the first side of the base.

2. The device of claim 1, wherein the expandable volume comprises an inflatable cushion.

3. The device of claim 2, further comprising a pumping device for actuating the inflatable cushion from the first position to the second position.

4. The device of claim 3, wherein the pumping device is disposed externally to the inflatable cushion.

5. The device of claim 1, wherein the expandable volume comprises a linear actuator.

6. The device of claim 1, wherein the second portion of the sheet is closer to the base in the second position than in the first position.

7. The device of claim 1, wherein the first portion of the sheet is decouplable from the base.

8. The device of claim 1, wherein the support apparatus is a bed, and the support apparatus coupler is couplable adjacent a head end of a mattress of the bed.

9. The device of claim 1, wherein the support apparatus is a bed, and the support apparatus coupler is couplable to a head end of a frame of the bed.

10. The device of claim 1, wherein the support apparatus is a bed, and the support apparatus coupler is couplable adjacent a bottom side of a mattress of the bed.

11. The device of claim 10, wherein actuation of the expandable volume from the first position to the second position raises a portion of the mattress of the bed.

12. The device of claim 1, wherein the support apparatus is a chair, and the support apparatus coupler is couplable to a back support portion of the chair.

13. The device of claim 12, wherein the chair is a wheel chair.

14. The device of claim 1, wherein the base includes a first base portion and a second base portion, the second base portion having a first end and a second end, wherein the first base portion includes the support apparatus coupler, and the first end of the second base portion is pivotably coupled to the first base portion, the expandable volume being disposed between the first base portion and the second base portion such that the second base portion pivots relative to the first base portion when the expandable volume actuates from the first position to the second position.

15. The device of claim 14, wherein the first base portion includes the first side and the second base portion includes the second side.

16. The device of claim 1, wherein the support apparatus is a bed having a mattress and the sheet has a first side for contacting skin of a patient and a second side for contacting the mattress, the first side of the sheet having a first coefficient of friction between the first side of the sheet and the skin of a patient and the second side of the sheet has a second coefficient of friction between the second side of the sheet and the mattress, wherein the first coefficient of friction is greater than the second coefficient of friction.

17. The device of claim 1, wherein the support apparatus is a bed having a mattress, and a coefficient of friction between a top surface of the mattress and a bottom side of the sheet is between 0.20 and 0.50.

18. The device of claim 17, wherein the coefficient of friction between a top surface of the mattress and a bottom side of the sheet is between 0.30 and 0.35.

19. The device of claim 18, wherein the coefficient of friction between a top surface of the mattress and a bottom side of the sheet is 0.33.

20. The device of claim 1, wherein the second portion of the sheet is not coupled to the support apparatus.

21. The device of claim 1, wherein the sheet further has side portions extending from the first portion to the second portion, wherein the side portions are not coupled to the support apparatus.

22. The device of claim 1, wherein the support apparatus coupler of the base is couplable below the head end of the support apparatus.

* * * * *